United States Patent
Parvathaneny et al.

[11] Patent Number: 5,829,006
[45] Date of Patent: Oct. 27, 1998

[54] SYSTEM AND METHOD FOR EFFICIENT RELATIONAL QUERY GENERATION AND TUPLE-TO-OBJECT TRANSLATION IN AN OBJECT-RELATIONAL GATEWAY SUPPORTING CLASS INHERITANCE

[75] Inventors: Bhaskar A. Parvathaneny; Venkatachary Srinivasan, both of Santa Clara, Calif.

[73] Assignee: International Business Machines Corporation, Armonk, N.Y.

[21] Appl. No.: 465,702

[22] Filed: Jun. 6, 1995

[51] Int. Cl.⁶ .................................................. G06F 17/30
[52] U.S. Cl. .................... 707/101; 707/100; 707/102; 707/103; 707/104
[58] Field of Search .................. 395/600, 500; 707/101, 102, 103, 104

[56] References Cited

U.S. PATENT DOCUMENTS

| | | | |
|---|---|---|---|
| 5,212,787 | 5/1993 | Baker et al. | 395/600 |
| 5,291,583 | 3/1994 | Bapat | 395/500 |
| 5,295,256 | 3/1994 | Bapat | 395/500 |
| 5,317,742 | 5/1994 | Bapat | 707/104 |
| 5,379,419 | 1/1995 | Heffernan et al. | 395/600 |
| 5,426,780 | 6/1995 | Gerull et al. | 707/102 |
| 5,437,027 | 7/1995 | Bannon et al. | 707/104 |
| 5,450,581 | 9/1995 | Bergen et al. | 355/600 |
| 5,499,371 | 3/1996 | Henninger et al. | 707/103 |
| 5,504,885 | 4/1996 | Alasqur | 707/103 |
| 5,548,749 | 8/1996 | Kroenke et al. | 707/103 |
| 5,564,113 | 10/1996 | Bergen et al. | 395/600 |
| 5,596,756 | 1/1997 | Shen et al. | 707/101 |
| 5,615,362 | 3/1997 | Jensen et al. | 707/103 |

*Primary Examiner*—Thomas G. Black
*Assistant Examiner*—Frantz Coby
*Attorney, Agent, or Firm*—Sterne, Kessler, Goldstein & Fox P.L.L.C.; Prentiss W. Johnson, Esq.

[57] ABSTRACT

An object-relational database gateway for use in a computing environment having a relational database management system (RDBMS) is disclosed. Object-oriented objects in the computing environment conform to a class inheritance hierarchy defined by an object-oriented schema. The gateway includes a query generator to generate from an object-oriented query a set of relational queries. The object-oriented query identifies one or more target objects of a target class which are desired to be constructed. The set of relational queries, when processed, enable the RDBMS to retrieve tuples required to initialize base attributes of the target objects that are defined by the target class and by any super-classes and sub-classes of the target class. The gateway also includes a tuple-to-object translator to translate the tuples to object-oriented objects consistent with the class inheritance hierarchy.

28 Claims, 17 Drawing Sheets

FIG. 8

Object: Query ⟵ 802
    X[ :<Conditionalist>:]
    Y is a superclass of X

Translated Object Query ⟵ 804
    SELECT  X.key, X.xi, ..., X.xn
    FROM    Xr X, ...
    WHERE   <xlated_conditionlist>

Relational Schema ⟵ 806    Object Schema ⟵ 808
Xr(key, x1, ..., xn)    X(x1, ..., xn)
Yr(key, y1, ..., ym)    Y(y1, ..., ym)
- Every table has the key as its first attribute (or set of attr)

Rule 1a

SELECT  X.key, X.x1, ..., X.xn, Y.y1, ..., Y.ym ⎫
    FROM    Xr X, Yr Y                                    ⎬ 810
    WHERE   <xlated_conditionlist> AND X.key = Y.key
    ORDER BY X.key ⎭

Rule 1b

SELECT  X.key, X.x1, ..., X.xn ⎫
    FROM    Xr X              ⎬ 812
    WHERE   <xlated_conditionlist>
    ORDER BY X.key ⎭

SELECT  Y.key, Y.x1, ..., Y.ym ⎫
    FROM    Xr X, Yr Y                      ⎬ 814
    WHERE   <xlated_conditionlist> AND X.key = Y.key
    ORDER BY Y.key ⎭

FIG. 9

Object Query ⟵902
    X[ :<Conditionalist>:]
    Y is a subclass of X

Translated Object Query ⟵904
    SELECT  X.key, X.x1, ..., X.xn
    FROM    Xr X, ...
    WHERE   <xlated_conditionlist>

Relational Schema ⟵906     Object Schema ⟵908
Xr(key, x1, ..., xn)          X(x1, ..., xn)
Yr(key, y1, ..., ym)         Y(y1, ..., ym)
- Every table has the key as its first attribute (or set of attr)

Rule 2

SELECT  X.key, X.x1, ..., X.xn
    FROM    Xr X
    WHERE   <xlated_conditionlist>   }910
    ORDER BY X.key SELECT  Y.key, Y.x1, ..., Y.ym
    FROM    Xr X, Yr Y
    WHERE   <xlated_conditionlist> AND X.key = Y.key  }912
    ORDER BY Y.key

FIG. 11

Object Query
    Emp[:salary > 10:]

Prefetch Path
    Emp.Dept

| Relational Schema | Object Schema |
|---|---|
| Employee(eid, ename, salary, deptid) | Emp(eid, ename, salary, dept) |
| Department (did, dname) | Dept(did, dname, empset) |

Required Query
    SELECT  E.eid, E.ename, D.did, D.dname, E.salary
    FROM    Employee E, Department D
    WHERE   E.salary > 10 AND
            E.deptid LEFT JOIN D.did Relational Queries
    SELECT  E.eid, E.ename, E.deptid, E.salary
    FROM    Employee E
    WHERE   E.salary > 10
    ORDER   BY E.deptid
    } 1102

SELECT  D.did, D.dname
    FROM    Employee E, Department D
    WHERE   E.salary > 10 AND E.deptid = D.did
    ORDER   BY D.did
    } 1104

FIG. 14

Object Query ⌐ 1402
  Emp[:salary > 10:]

Prefetch Path ⌐ 1404
  Person.spouse

Query set to retrieve target class and super class tuples (without consideration of prefetch path)

```
SELECT    Emp.ID, Emp.salary
FROM      Employee Emp                  ⎫
WHERE     Emp.salary > 10               ⎬ 1406
ORDER BY  Emp.ID                        ⎭
```

```
SELECT    Per.ID, Per.name                          ⎫
FROM      Employee Emp, Person Per                  ⎬ 1408
WHERE     Emp.salary > 10 and Per.ID = Emp.ID       
ORDER BY  Per.ID                                    ⎭
```

Amended query set (prefetch path taken into account - new text indicated by underlining)

```
SELECT    Emp.ID, Emp.salary            ⎫
FROM      Employee Emp                  ⎬ 1410
WHERE     Emp.salary > 10               
ORDER BY  Emp.ID                        ⎭
```

```
SELECT    Per.ID, Per.name, Per.spouse-id           ⎫
FROM      Employee Emp, Person Per                  ⎬ 1412
WHERE     Emp.salary > 10 and Per.ID = Emp.ID       
ORDER BY  Per.ID                                    ⎭
```

```
SELECT    Per2.ID, Per2.name                        ⎫
FROM      Person Per, Person Per2                   ⎬ 1414
WHERE     Per.salary > 10 and Per.spouse-id = Per2.ID
ORDER BY  Per2.ID                                   ⎭
```

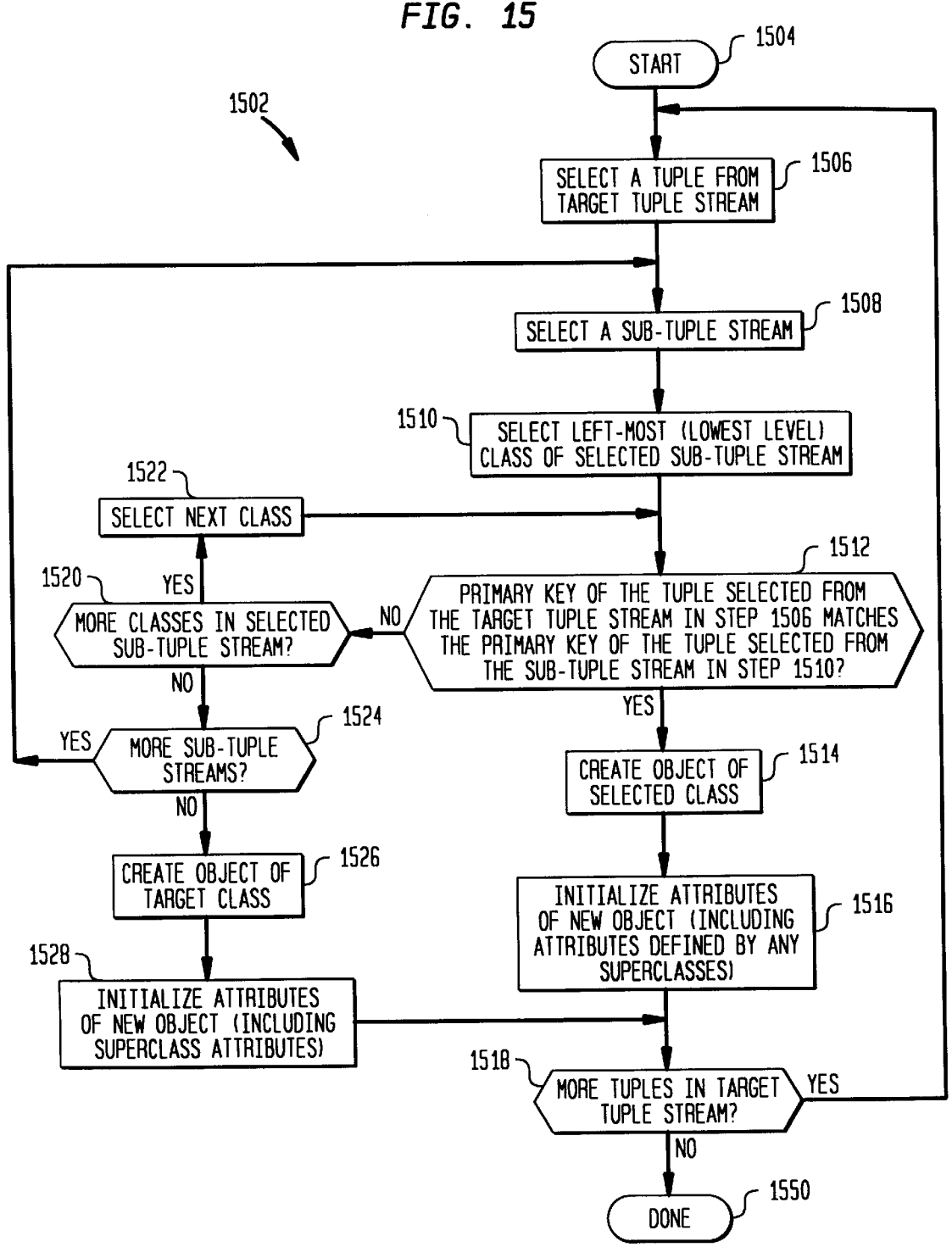

SYSTEM AND METHOD FOR EFFICIENT RELATIONAL QUERY GENERATION AND TUPLE-TO-OBJECT TRANSLATION IN AN OBJECT-RELATIONAL GATEWAY SUPPORTING CLASS INHERITANCE

DESCRIPTION

Technical Field

The present invention relates generally to databases, and more particularly to an object-relational database gateway that supports single and multiple class inheritance.

CROSS-REFERENCE TO OTHER APPLICATIONS

The following applications of common assignee are related to the present application:

U.S. patent application entitled "Generating an Optimized Set of Relational Queries for Fetching Data in an Object-Relational Database Gateway", Ser. No. 08/366,238, filed Dec. 29, 1994, incorporated herein by reference in its entirety.

U.S. patent application entitled "System and Method for Efficiently Translating Relational Tuples to Object-Oriented Objects", Ser. No. 08/366,541, filed Dec. 29, 1994, incorporated herein by reference in its entirety.

BACKGROUND ART

An object-oriented computing environment typically includes an object-oriented database (or multiple object-oriented databases) for storing data according to an object-oriented database schema. The object-oriented database schema specifies the information needed to define the classes and the class inheritance hierarchy for the objects stored in the object-oriented database, such as the attributes for each class, the data type of each attribute, etc.

A great amount of data is currently stored in existing relational database management systems (RDBMS), such as DB2 produced by International Business Machines (IBM) Corporation, Oracle produced by Oracle Corp., and Sybase produced by Sybase Inc. Data is stored in a relational database according to a relational database schema, which specifies the tables in the relational database, the number of columns in each table, the nature of such columns, etc.

It would be beneficial if applications operating in object-oriented computing environments could access in an object-oriented manner data in relational database management systems. However, there are many problems that must be overcome before such object-oriented access to relational database management systems can be allowed. These problems stem from the fact that data is stored in a relational database according to a relational database schema, whereas data is stored in an object-oriented database according to an object-oriented database schema.

For example, a relational database management system typically returns tuples (i.e., rows of a table) when it is queried. Object-oriented applications, however, do not expect to receive tuples when they make object-oriented database queries. Instead, object-oriented applications expect to receive objects (or pointers to objects) which conform to the class inheritance hierarchy defined by the object-oriented database schema.

Thus, what is required is a system and method for enabling an object-oriented application to access data in a relational database management system in an object-oriented manner. In particular, what is required is a system and method for efficiently retrieving and translating relational tuples to object-oriented objects in such a manner that the class inheritance hierarchy defined by the object-oriented database schema is satisfied. The object-oriented objects are provided (either directly or via pointers) to the object-oriented application.

DISCLOSURE OF INVENTION

Briefly stated, the present invention is directed to an object-relational database gateway for use in a computing environment having a relational database management system (RDBMS). Object-oriented objects in the computing environment conform to a class inheritance hierarchy defined by an object-oriented schema.

The gateway includes a query generator to generate from an object-oriented query a set of relational queries. The object-oriented query identifies one or more target objects of a target class which are desired to be constructed. The set of relational queries, when processed, enable the RDBMS to retrieve tuples required to initialize base attributes of the target objects that are defined by the target class and by any super-classes and sub-classes of the target class.

According to the present invention, the query generator modifies the set of relational queries according to any prefetch paths to produce a modified set of relational queries that, when processed, enable the RDBMS to additionally retrieve tuples required to initialize base attributes of prefetch path objects that are defined by associated prefetch path class (es) and by any super-classes and sub-classes of the prefetch path class(es). The gateway also includes a tuple-to-object translator to translate the tuples to object-oriented objects consistent with the class inheritance hierarchy.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF DRAWINGS

The present invention will be described with reference to the accompanying drawings, wherein:

FIGS. 8 and 9 depict rules which the invention follows when generating relational queries (taking into account super-classes and sub-classes);

FIG. 11 is used to describe the manner in which the present invention modifies a translated object query in accordance with prefetch paths when super-classes and sub-classes are not considered;

FIGS. 13A, 13B, and 14 are used to illustrate the manner in which the present invention modifies relational queries in accordance with prefetch paths when super-classes and sub-classes are considered;

FIG. 15 is a flowchart depicting the manner in which the present invention performs tuple-to-object translation so as to adhere to a class inheritance hierarchy specified in an object schema;

BEST MODE FOR CARRYING OUT THE INVENTION

Figure 1:
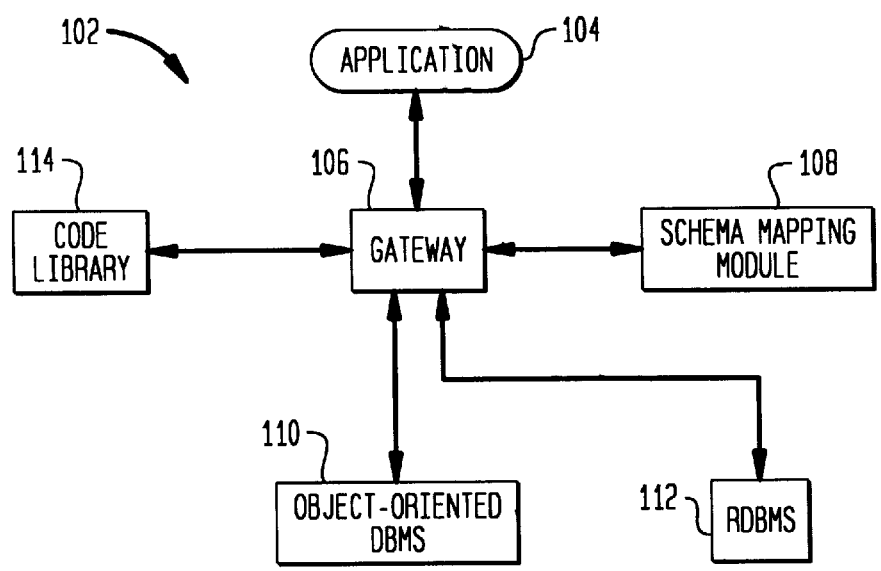
FIG. 1 is a block diagram of an object-oriented computing environment according to a preferred embodiment of the present invention.

FIG. 1 is a block diagram of an object-oriented computing environment 102 according to a preferred embodiment of the present invention. The object-oriented computing environment 102 includes at least one object-oriented database management system (DBMS) 110 which stores data according to an object-oriented database schema. The object-oriented database schema specifies the information needed to define the classes and the class inheritance hierarchy for the objects stored in the object-oriented DBMS 110, such as the attributes for each class, the data type of each attribute, etc. A suitable form of the object-oriented DBMS is the "ObjectStore" DBMS produced by Object Design of Burlington, Mass. However, any other commercial object-oriented DBMS is also suitable.

The object-oriented computing environment 102 also includes at least one relational database management system (RDBMS) 112. The RDBMS 112 can alternatively be viewed as existing outside of the object-oriented computing environment 102, but physically connected to components in the object-oriented computing environment 102 (in particular, to a gateway 106). A suitable form of the RDBMS 112 is DB2 produced by IBM, Oracle produced by Oracle Corp., and/or Sybase produced by Sybase Inc.

Object-oriented applications, such as application 104, access the data in the object-oriented DBMS 110 (the application 104 represents an example of an object-oriented source). Such access is performed in a well known, object-oriented manner according to a well known object-oriented database interface. The object-oriented database interface is consistent with the object-oriented database schema of the object-oriented DBMS 110.

The present invention also allows the application 104 to access the data in the RDBMS 112 via an object-relational database gateway 106. According to the present invention, the application 104 accesses the RDBMS 112 in an object-oriented manner. It should be understood that, while the invention is described herein in terms of having a relational database management system, the present invention is also adapted for use with other non-object-oriented database management systems, such that these other database management systems can be accessed in an object-oriented manner.

Figure 4:
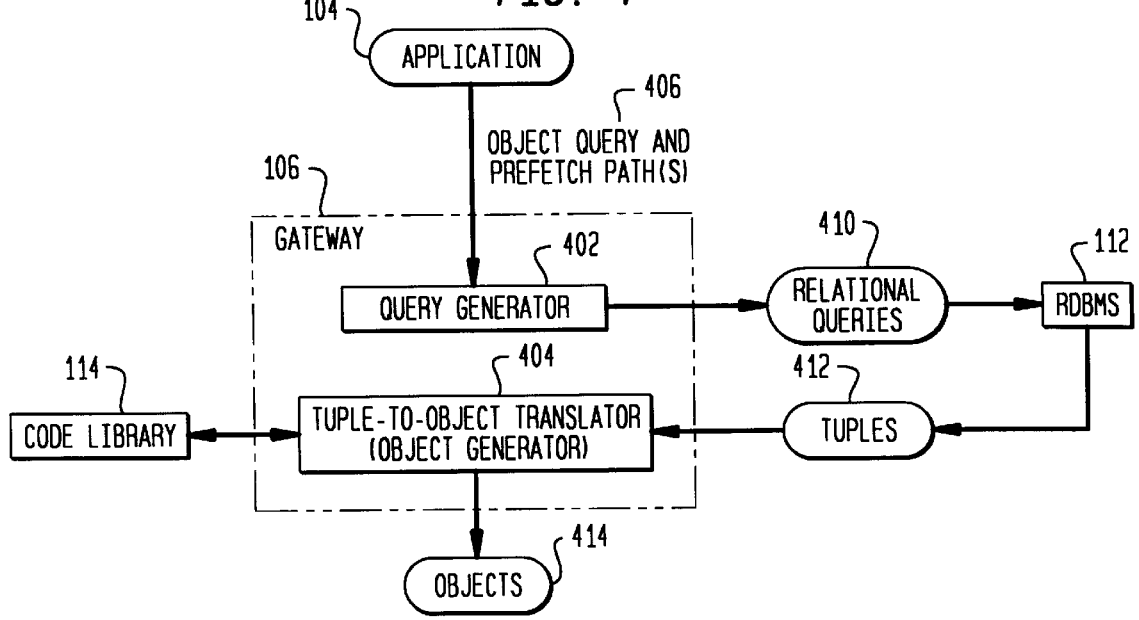
FIG. 4 is a block diagram of a gateway according to a preferred embodiment of the present invention.

According to the present invention, the application 104 generates and transfers object-oriented database queries (also called object queries herein) and an (optional) set of prefetch paths associated with the object queries to the gateway 106. As shown in FIG. 4, the gateway 106 includes a query generator 402 and a tuple-to-object translator (also called an object generator) 404. For illustrative purposes, the query generator 402 is shown as receiving an object query and zero or more prefetch paths 406 from the application 104.

The query generator 402 analyzes the object query and the prefetch paths and generates a set of relational database queries 410 (also called relational queries herein). These relational queries 410 are capable of retrieving from the RDBMS 112 information needed to initialize base attributes of objects (called "target objects" for reference purposes) of a class (called "target class" for reference purposes) identified by the object query, including base attributes of the target objects that are defined by any super-classes and any sub-classes of the target class (as defined by the object oriented schema). The term "target" is used here since the target objects of the target class are the "targets" of the object query.

More particularly, the term "target class" represents the type of the pointers in the collection of "target objects" returned as a result of the object query. The target class basically defines how we are viewing the results of the object query. The target objects themselves can be objects of the target class or of any sub-types of the target class. When creating an object of target class C, the following base attributes need to be initialized:

(i) the base attributes defined in Class C.
  (ii) the base attributes defined in every super-class of C.

When creating an object of a sub-class (class S) of the target class C, the following base attributes need to be initialized:

(i) the base attributes defined in the target class C.
  (ii) the base attributes defined in all of the super-classes of class C.
  (iii) the base attributes defined in the class S.
  (iv) the base attributes defined in all the super-classes of class S which are also sub-classes of target class C.

Figure 20:
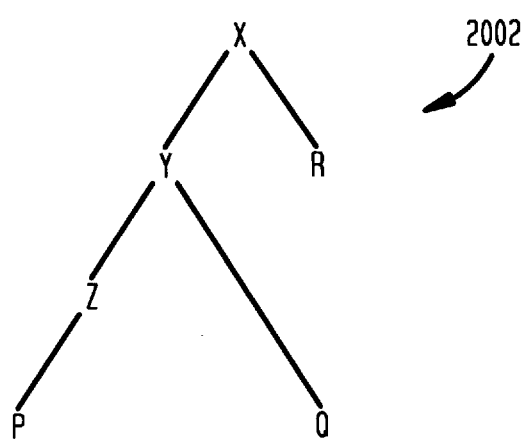

For example, given the example class hierarchy 2002 in FIG. 20, and an object query on target class Y, the target objects can be of type Y. or any sub-class of Y namely Z, P and Q (even though all pointers to these Y, Z, P and Q objects are typed as pointers to Y objects).

When creating an object of target class Y, the following base attributes need to be initialized:

(i) the base attributes defined in Class Y
  (ii) the base attributes defined in every super-class of Y (i.e., Class X).

When creating an object of class P, the following base attributes need to be initialized:

(i) the base attributes defined in Class Y
  (ii) the base attributes defined in every super-class of Y (i.e., Class X), (iii) the base attributes defined in the class P,
(iv) the base attributes defined in all the super-classes of class P which are also sub-classes of target class Y (i.e., class Z).

The relational queries 410 generated by the query generator 402 are also capable of retrieving from the RDBMS 112 information needed to initialize base attributes of objects (called "prefetch path objects" for reference purposes) of classes (called "prefetch path classes" for reference purposes) identified by the prefetch paths, including base attributes of the prefetch path objects that are defined by any super-classes and any sub-classes of the prefetch path class (as defined by the object oriented schema). (While the relational queries 410 are shown as being directed to the RDBMS 112 from the query generator 402, in another embodiment of the invention the relational queries 410 are instead passed to the object generator 404, and the object generator 404 issues the queries 410 to the RDBMS 112.) This operation of the query generator 402 is described below.

The RDBMS 112 returns tuples 412 (i.e., rows from one or more tables) as a result of processing the relational queries 410. The object generator 404 receives these tuples 412. According to the present invention, the object generator 404 does not transfer these tuples 412 to the application 104, since the application 104 expects to receive object-oriented objects, not tuples. Instead, the object generator 404 efficiently translates these tuples into object-oriented objects 414. According to the present invention, this translation is performed so as to adhere to the class inheritance hierarchy defined by the object oriented schema.

This translation involves the performance of "swizzling." Swizzling is a well known database term. As used with the present invention, swizzling refers to the process of: (a) converting foreign keys (described below) to pointers or sets of pointers; and (b) setting relationship attributes (described below) in objects equal to these pointers.

While operating as just described above, the object generator 404 calls functions contained in a code library 114. The object generator 404 transfers the objects 414 (or pointers to the objects 414) to the application 104. The object generator 404 is described in greater detail below.

Figure 2:
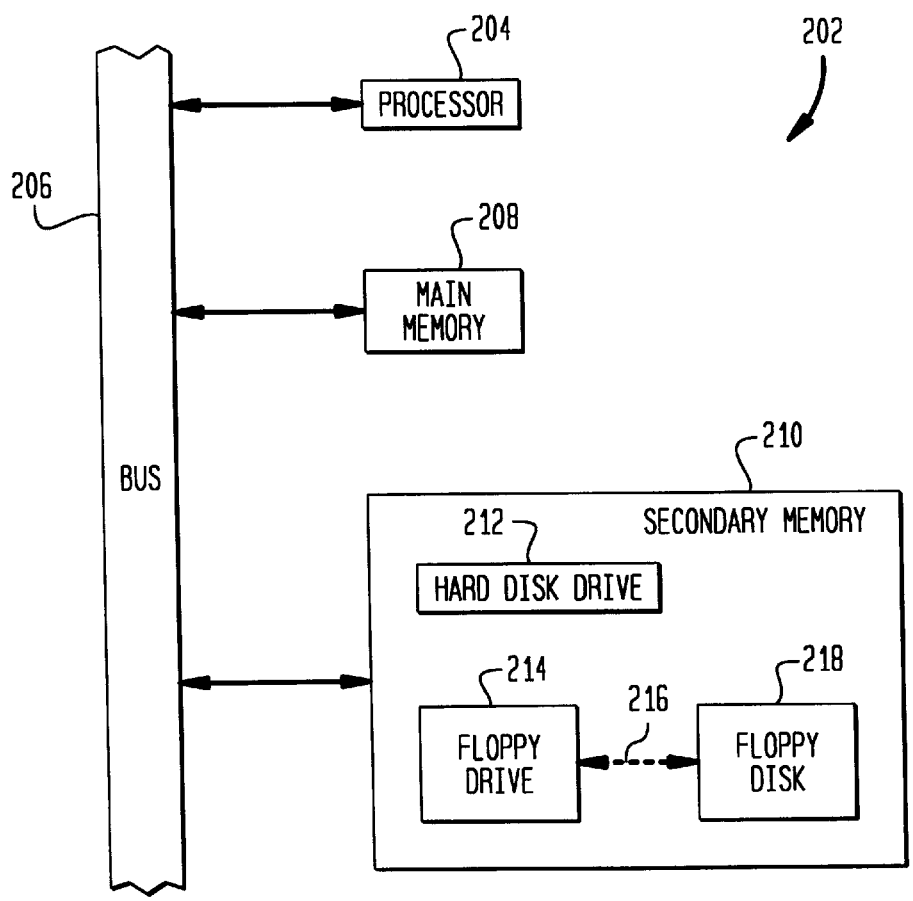
FIG. 2 is a block diagram of a computer system in which the computing environment of FIG. 1 resides.

The object-oriented computing environment 102 preferably exists in a computer system 202 as shown in block diagram form in FIG. 2. The computer system 202 includes one or more processors, such as processor 204, which is connected to a communication bus 206. The computer system 202 also includes a main memory 208, preferably random access memory (RAM), and a secondary memory 210 that includes, for example, a hard disk drive 212 and/or a floppy disk drive 214.

The application 104, gateway 106, schema mapping module 108 (described below), code library 114 (described below), object-oriented DBMS 110, and RDBMS 112 preferably represent computer programs and/or libraries which reside (during run-time) in the main memory 208, and which are executed by the processors in the computer system 202, such as processor 204. (The data maintained by the object-oriented DBMS 110 and the RDBMS 112 may be stored in the main memory 208 and/or the secondary memory 210. Also, the computer programs/libraries associated with the application 104, gateway 106, schema mapping module 108, code library 114, object-oriented DBMS 110, and RDBMS 112 may be stored in a floppy disk 218 or some other removable storage medium, which is read by the floppy drive 214 or some other storage unit). The computer system 202 may also be connected to a network. In this case, data may be retrieved from relational tables stored in storage devices in communication with the computer system 202 via the network.

The gateway 106, the schema mapping module 108, and the code library 114, when executed, enable the computer system 202 to perform the features of the present invention as discussed herein. Thus, the gateway 106, the schema mapping module 108, and the code library 114 represent controllers of the computer system 202.

A suitable form of the computer system 202 is the well known RISC System/6000 family of computers produced by IBM. Alternatively, the computer system 202 is the well known System/390 family of computers produced by IBM. It should be understood, however, that other computers could alternatively be used without departing from the scope and spirit of the present invention.

Schema Mapping Module

According to the present invention, the application 104 is enabled to access the RDBMS 112 in an object-oriented manner. In other words, the application 104 works using an object-oriented view of the relational database schema. All operations initiated by the application 104 which involve the RDBMS 112 are in the object-oriented database schema. However, since the RDBMS 112 stores data according to a relational database schema, there needs to be a mechanism by which the relational database schema is mapped to the object-oriented database schema. In the present invention, this mechanism is represented by the schema mapping module 108.

The schema mapping module 108 maps the relational database schema of the RDBMS 112 into the object-oriented schema associated with the object-oriented DBMS 110. The schema mapping module 108 preferably represents a schema mapping object that is stored persistently and that can be used when accessing relational data using the object-oriented schema.

Figure 3A:
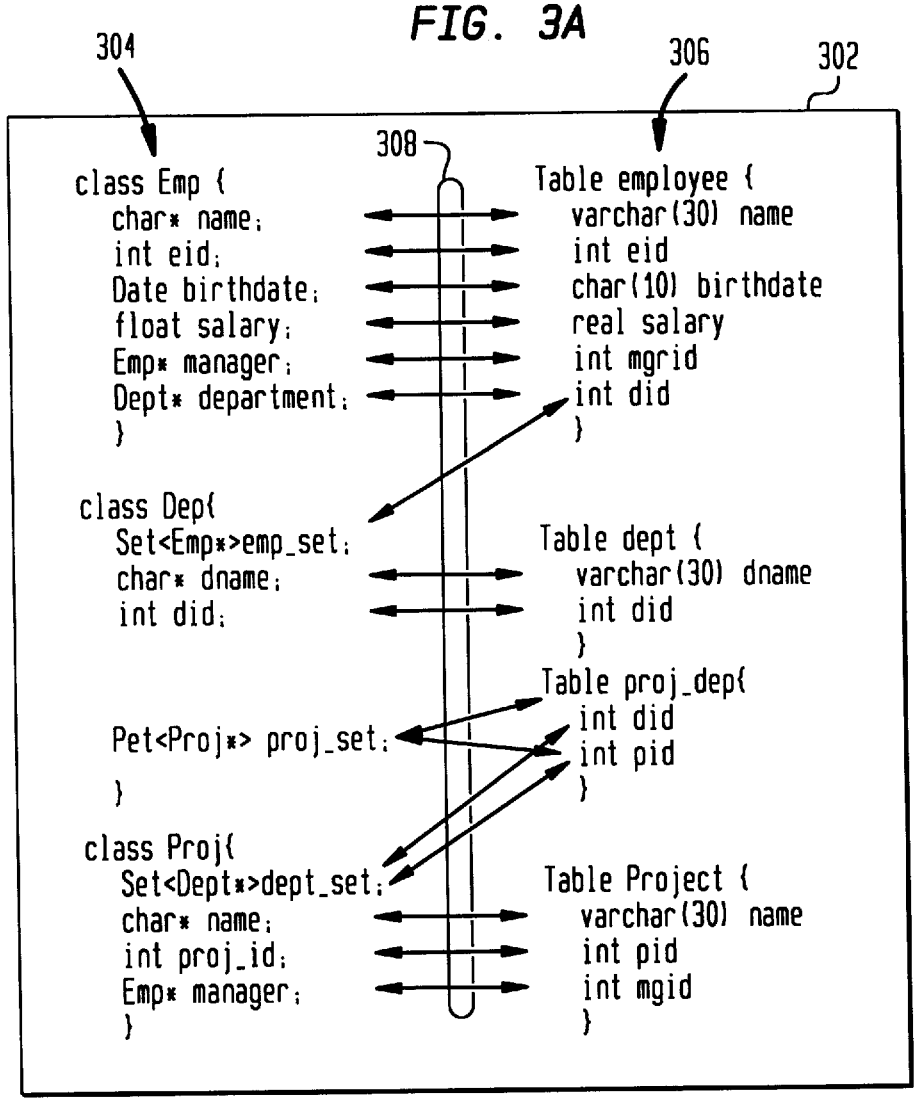
FIGS. 3A, 3B, and 3C are used to describe schema mapping.

An example of a schema mapping is provided in FIG. 3A, which shows a representation of an object-oriented database schema 304 and a representation of a relational database schema 306. A schema mapping between the object-oriented database schema 304 and the relational database schema 306 is indicated by arrows 308 (for example, the pointer "name" in the class "Emp" maps to the variable "name" in the table "employee"). Thus, if so queried, the schema mapping module 108 would indicate that the 30 character string variable "name" in the table employee maps to a pointer "name" in the class Emp which points to a character string.

Schema mapping is a well known process. Accordingly, the discussion below focuses on particular characteristics of the schema mapping module 108 which are pertinent and/or specific to the present invention. Implementation of the schema mapping module 108 as described herein will be apparent to persons skilled in the relevant art.

According to the present invention, each class is assumed to be mapped to a single relational table or view (although intermediate tables are used to represent many-to-many relationships). Thus, in the example of FIG. 3A, class "Emp" maps to table "employee," class "Dept" maps to table "dept," and class "Proj" maps to table "project." An intermediate table "proj_dep" is used to represent the many-to-many relationship involving "proj_set" and "dept_set."

In this scheme, if a class needs to be mapped to multiple tables or views, a new view is created in the relational database which incorporates the definitions of one or more tables or views and the class is subsequently mapped to the newly created view.

Also, each class belonging to a class inheritance hierarchy is mapped to a different table. The set of tables that map to an inheritance hierarchy share a primary key value that is used to uniquely identify the objects in the inheritance hierarchy. The table for each class only stores the attributes explicitly defined by that class. The table for each class does not store the attributes that are defined by any super-classes. Instead, the attributes defined by a super-class are stored in the table that maps to the super-class.

Figure 3B:
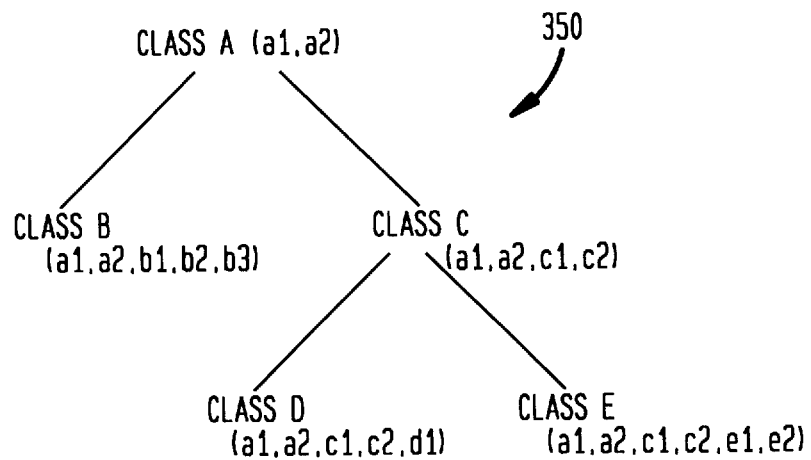

Consider the example class inheritance hierarchy 350 shown in FIG. 3B. The attributes defined and inherited by each class are indicated in FIG. 3B. For example, Class A defines two attributes a1 and a2. Classes B, C, D, and E, which are sub-classes of class A, each inherit attributes a1 and a2 of class A. Class B also defines attributes b1, b2, and b3. Class C defines attributes c1 and c2. Classes D and E, which are sub-classes of class C, inherit attributes c1 and c2. Class D also defines attribute d1, and class E defines attribute e1 and e2.

Figure 3C:
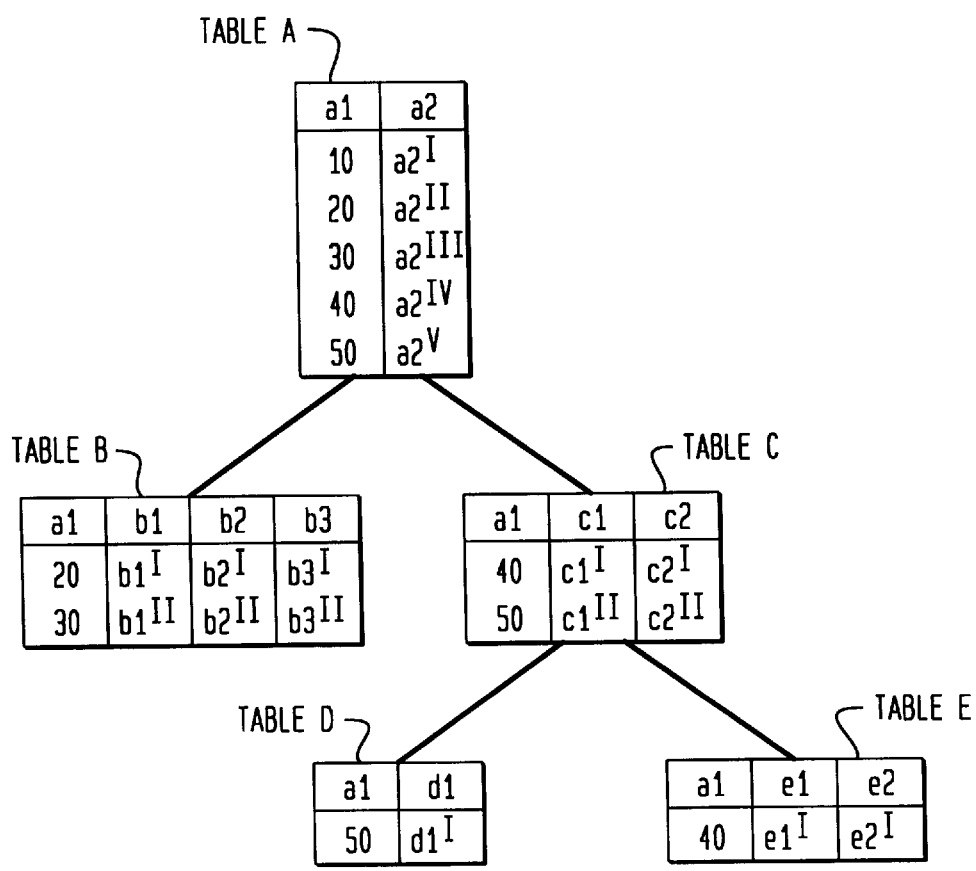

FIG. 3C illustrates the relational database tables which correspond to the class hierarchy 350 of FIG. 3B. Each class A, B, C, D, and E maps to a different Table A, B, C, D, and E, respectively. Note that the table for each class only stores the attributes explicitly defined by that class, and not the attributes defined by any super-class. Consider Table E, which maps to class E. Class E defines attributes e1 and e2, and inherits attributes a1 and a2 from super-class A, and inherits attributes c2 and c2 from super-class C. Accordingly, Table E only stores attributes e1 and e2, as well as attribute a1, which is (in the example of FIGS. 3B and 3C) the primary key value that appears in all of the tables.

As noted above, the primary key value a1 is used to uniquely identify the objects in the inheritance hierarchy. Consider the object having a primary key value a1=50. This key value a1=50 appears in Tables A, C, and D, which map to classes A, C, and D, respectively. As will be appreciated by persons skilled in the art, the object corresponding to key value a1=50 is of class D, because class D is the most derived class in the class hierarchy shown in FIG. 3B whose corresponding table shown in FIG. 3C contains the primary key value a1=50.

Each table stores primary key values specific to itself, and primary key values specific to its sub-classes. For example, Table A in FIG. 3C stores key value a1=10 which is specific to itself (since it does not appear in any of its sub-classes B, C, D, and E), and also key values a1=20,30,40,50 which are specific to its sub-classes B, C, D, and E. Note that key values a1=20,30 appear in Table B, and key values a1=40,50 appear in Tables C, D, and E.

According to the present invention, different branches of each class hierarchy have disjoint object sets. For example, considering FIG. 3B, an object that appears in the branch containing class B cannot also appear in the branch containing classes C, D, and E. Also, an object contained in branch D cannot also appear in the branch containing class E (note that classes D and E "branch" from class C).

As a consequence of this "disjoint object set" condition, the same key value attribute cannot appear in tables which correspond to different branches of the class hierarchy. Considering FIG. 3C, note that a1 is equal to 20 and 30 in the branch containing Table B. These values of a1 do not appear in the branch containing Tables C, D, and E (in this branch, a1 is equal to 40 and 50). Similarly, the values of a1 are different in the two branches containing Tables D and E, respectively.

Also according to the present invention, every class in the schema mapping is assumed to have two types of attributes, base attributes and relationship (or non-base) attributes.

Base attributes are the attributes in a class that do not contain pointers to other objects. Thus, in the example of FIG. 3A, with respect to the class "Emp," the following are base attributes: name, eid, birthdate, and salary.

Relationship attributes in a class are the attributes that are not base attributes, namely they are either pointer valued attributes or set valued attributes that contain pointers to other objects. In the example of FIG. 3A, with respect to the class "Emp," the following are relationship attributes: manager (which is a pointer to an object of class Emp) and department (which is a pointer to an object of class Dept).

According to the present invention, the schema mapping module 108 can be accessed and queried (by the gateway 106, for example). The schema mapping module 108 can be queried for the following information:

1. Given the name of a class (or a collection), return the following:
   (a) The table which corresponds (i.e., maps) to the class, and the set of columns in the corresponding table which map to the base attributes of the class. For example, if the class "Emp" is passed to the schema mapping module 108, then the schema mapping module 108 would return information identifying the following columns of the relational table "employee": name, eid, birthdate, and salary.
   (b) The column(s) of the primary key in the table which corresponds to the class. As is well known, a primary key uniquely identifies each row, also called tuple, in a relational table. For example, assume that "eid" is the primary key in the table "employee." If the class "Emp" is passed to the schema mapping module 108, then the schema mapping module 108 would return information identifying the column "eid" of the table employee.
   (c) The set of super-classes of the class. Note that multiple inheritance is supported by the present invention.
   (d) The set of sub-classes of the class.

2. Given the name of a class (or a collection), and an attribute name, return the following:
   (a) the super-class where the attribute is actually defined.

3. Given the name of a relationship in the form of a path expression (a pointer or a set of pointers) (e.g., Emp.department), return the following information:
   (a) The member name and arity of the reverse pointer (if one exists) from the target class to the source class. The target class is the class of the object pointed to by the path expression provided to the schema mapping module 108. The source class is the class in which the path expression (i.e., pointer) is contained. In some instances, the target class will contain a pointer that points back to the source class. This is called a reverse pointer. In such cases, the schema mapping module 108 returns the name of this reverse pointer. The schema mapping module 108 also returns the arity of the relationship between the source class and the target class with respect to the reverse pointer (i.e., whether it is one-to-one, one-to-many, many-to-many, or many-to-one).
   (b) The foreign key or list of foreign keys (in intermediate tables) in this corresponding relational table that defines the relationship provided to the schema mapping module 108. A foreign key is a value in the corresponding relational table that maps to a non-base attribute in the class. Thus, in table employee of FIG. 3A, mgrid and did are foreign keys. If Emp.department is passed to the schema mapping module 108, then the schema mapping module 108 returns "did," which is the foreign key that maps to "department" in the class Emp.

(c) The arity (e.g., one-to-one, one-to-many, many-to-many, many-to-one) of the relationship provided to the schema mapping module 108. Assume that the class Emp includes the following definition:
Emp* spouse;
Also assume that the table employee includes the following definition:
int spouseid;
This represents a one-to-one relationship, since each person (presumably) has a single spouse. Thus, if Emp.spouse is passed to the schema mapping module 108, the schema mapping module 108 would return an arity of "one-to-one". Now assume that Emp.department is passed to the schema mapping module 108. Each employee has a single department, but each department may contain many employees. This relationship is represented in the class Dept by the set "emp_set" of pointers to Emp objects ("did" is also the foreign key for emp_set). Thus, this represents a "many-to-one" relationship (or, equivalently, a "one-to-many" relationship). Accordingly, the schema mapping module 108 would return an arity of "many-to-one".

(d) The primary key in the table that maps to the owning class. The owning class is the class whose objects are pointed to by the pointer provided to the schema mapping module 108. For example, the owning class of the pointer department in class Emp is "Dept". Table dept maps to class Dept; thus, the schema mapping module 108 returns "did" (assuming that did is the primary key of table dept). The owning class of the pointer manager in class Emp is "Emp". Table employee maps to class Emp; thus, the schema mapping module 108 returns "eid" (assuming that eid is the primary key of table Emp).

Prefetch Paths

As is well known, a given object may store pointers to other objects. These other objects may be accessed by accessing the pointers in the given object. Thus, in order to access these other objects via the given object, it is necessary to dereference such pointers in the given object (the term "dereference" or "dereferencing" refers to the process of accessing an object's values given a pointer to the object, i.e., the process of going to the actual object from a pointer is termed dereferencing a pointer).

As discussed below, the query generator 402 generates a translated object query (which is a relational query) directly from the object query passed to the query generator 402 from the application 104. This translated object query is capable of retrieving from the RDBMS 112 the information needed to construct the base attributes of the given object (called the top-level object). More work is needed, however, to initialize other objects pointed to by the relationship attributes in the top-level object.

One way to prefetch objects is to recursively retrieve all objects pointed to by objects that are the result of the top level query. (As used herein, the term "prefetching" refers to the operation of retrieving data from the RDBMS 112, in response to an object query, for the purpose of initializing objects related to objects that form the result of the object query.) This would almost certainly result in major performance problems by fetching too many objects that are not needed by the application 104.

A second alternative is to not fetch any object except the top-level objects but initialize the pointers using some special values. Attempts to access such special pointers will lead to an interrupt that can be trapped and the object pointed-to can be retrieved at that time. This second solution is called "object faulting" and can also cause performance problems since dereferencing every pointed-to object will cause a relational query to be generated and executed to retrieve one object. This will also most likely result in low performance.

The query generator 402 preferably employs a third approach to prefetch data. According to this third approach, the application 104 (or user) is required to provide zero or more prefetch paths with the object query. If a prefetch path is not provided, then only the base attributes of the top-level objects are initialized. If additional objects (pointed to by the top-level objects) need to be prefetched and initialized, then the user must explicitly specify the paths (starting from the top-level objects) leading to those objects. Only the objects along these prefetch paths are fetched and initialized. Other relationship attributes that are not along the specified prefetch paths will have invalid pointers.

Prefetch paths are passed by the user or application 104 as strings along with the original object query. The query generator 402 uses the translated object query and the prefetch paths (as well as information obtained from the schema mapping module 108) to generate relational queries 410 that are capable of retrieving from the RDBMS 112 all data (i.e., tuples 412) needed to initialized the objects and the attributes indicated by the prefetch paths (including base attributes defined by super-classes and sub-classes).

If no prefetch paths are passed, then only the base attributes of the top level objects are returned. Any attempt to dereference the relationship attributes in these objects will result in an exception.

The following information is part of the prefetch path information:

1. Top Level Class: This parameter provides the name of the class being queried by the object query. Information on this class can be obtained by accessing the schema mapping module 108.

2. Prefetch Path Set: A set of path strings specify relationships along a path starting from the top level class. For example, paths starting from Emp class in FIG. 3A include "department.proj_set.dept_set", "proj_set", "manager.manager", "department.emp_set", etc.

Code Library

As noted above, the object generator 404 efficiently translates the tuples 412 retrieved from the RDBMS 112 into object-oriented objects 414. In performing this function, the object generator 404 calls functions contained in a code library 114. The code library 114, which is preferably a generated code library, is described in this section. (According to one embodiment, the code library 114 forms a part of the invention. According to another embodiment, the code library 114 is not part of the invention. In this embodiment, it is assumed that the computing environment in which the invention operates provides a code library 114 having the functionality described herein.)

The code library 114 includes functions to create and manipulate objects, and to perform auxiliary operations such as manipulating tables to keep track of objects that have been created. Available functions include, for example, functions to create objects (allocating memory for objects, then instantiating the objects in accordance with the object database schema), functions to initialize the base attributes of objects using tuples retrieved from the RDBMS 112 (this may involve a mapping from the data type of a tuple field to the data type of the corresponding object data member), functions to clean up objects (remove them from memory), functions to compare objects (for example, functions that compare old values of objects to new values retrieved from tuples and also other functions that compare keys), functions for setting the RDB (relational database) types of the object data members, functions for initializing the relationship attributes (pointers) of objects, and functions to identify the tuple columns which map to the class data members.

Preferably, a set of object manipulation functions exists for each class. In practice, a base class is defined which generically declares (but does not define) these object manipulation functions. Derived classes (inheriting from this base class) are then created for each class of interest. These derived classes define the actual implementations on a per class basis for the object manipulation functions.

The code library 114 also includes functions to perform auxiliary operations, such as functions to allocate memory to store table entries (which are used to keep track of objects that have been created), functions to create and initialize table entries, functions to free memory being used by table entries, functions to allocate memory to store intermediate table elements used in swizzling many-to-many relationships, functions to free memory being used by intermediate table elements, and functions to create and otherwise manipulate object keys.

The code library 114 is further described in U.S. patent application entitled "System and Method for Efficiently Translating Relational Tuples to Object-Oriented Objects," referenced above and incorporated by reference herein.

Operation of the Object-Relational Gateway

The operation of the gateway 106 of the present invention shall now be described in greater detail with reference to a flowchart 502 in FIG. 5. Flowchart 502 begins with step 504, where control immediately passes to step 506.

In step 506, the gateway 106 (in particular, the query generator 402) receives the object query and zero or more prefetch paths from the application 104.

In step 508, the query generator 402 analyzes the object query and generates a set of relational database queries 410 (also called relational queries herein). These relational queries 410 are capable of retrieving from the RDBMS 112 information needed to initialize base attributes of objects (called "target objects" for reference purposes) of a class (called "target class" for reference purposes) identified by the object query, including base attributes of the target objects that are defined by any super-classes and any sub-classes of the target class (as defined by the object oriented schema). As noted above, the term "target" is used here since the target objects of the target class are the "targets" of the object query. Step 508 is described in further detail in a section below.

In step 510, the query generator 402 modifies the relational queries 410 in accordance with any prefetch paths received from the application 104. The modified relational queries 410, in addition to being capable of retrieving tuples needed to initialize base attributes of the target objects (as just described above), are also capable of retrieving from the RDBMS 112 information needed to initialize base attributes of objects (called "prefetch path objects" for reference purposes) of classes (called "prefetch path classes" for reference purposes) identified by the prefetch paths, including base attributes of the prefetch path objects that are defined by any super-classes and any sub-classes of the prefetch path class (as defined by the object oriented schema). Step 510 is described in further detail in a section below.

In step 512, the gateway 106 transfers the modified relational queries 410 to the RDBMS 112, and instructs the RDBMS 112 to process the modified relational queries 410.

The RDBMS 112 processes the modified relational queries 410 in a well known manner. As a result of processing the modified relational queries 410, the RDBMS 112 retrieves and returns tuples 412 to the gateway 106.

The object generator 404 in the gateway 106 receives these tuples 412. According to the present invention, the object generator 404 does not transfer these tuples 412 to the application 104, since the application 104 expects to receive object-oriented objects, not tuples. Instead, the object generator 404 in step 514 efficiently translates these tuples into object-oriented objects 414. According to the present invention, this translation is performed so as to adhere to the class inheritance hierarchy defined by the object oriented schema. Step 514 is described in further detail in a section below.

The operation of flowchart 502 is complete after step 514 is performed, as indicated by step 516.

Directed Acyclic Graph (DAG)

According to a preferred embodiment of the present invention, the gateway 106 operates as described above by first creating a directed acyclic graph (DAG), and then executing the DAG. The query generator 402 and the object generator 404 preferably operate in concert to create the DAG, although alternatively the query generator 402 or the object generator 404 operates alone to create the DAG.

The DAG includes a plurality of nodes, where each node represents one or more operations which are to be performed by the gateway 106. Thus, the gateway 106 executes the DAG by executing the nodes in the DAG (i.e., performing the operations specified by the DAG nodes).

Figure 6:
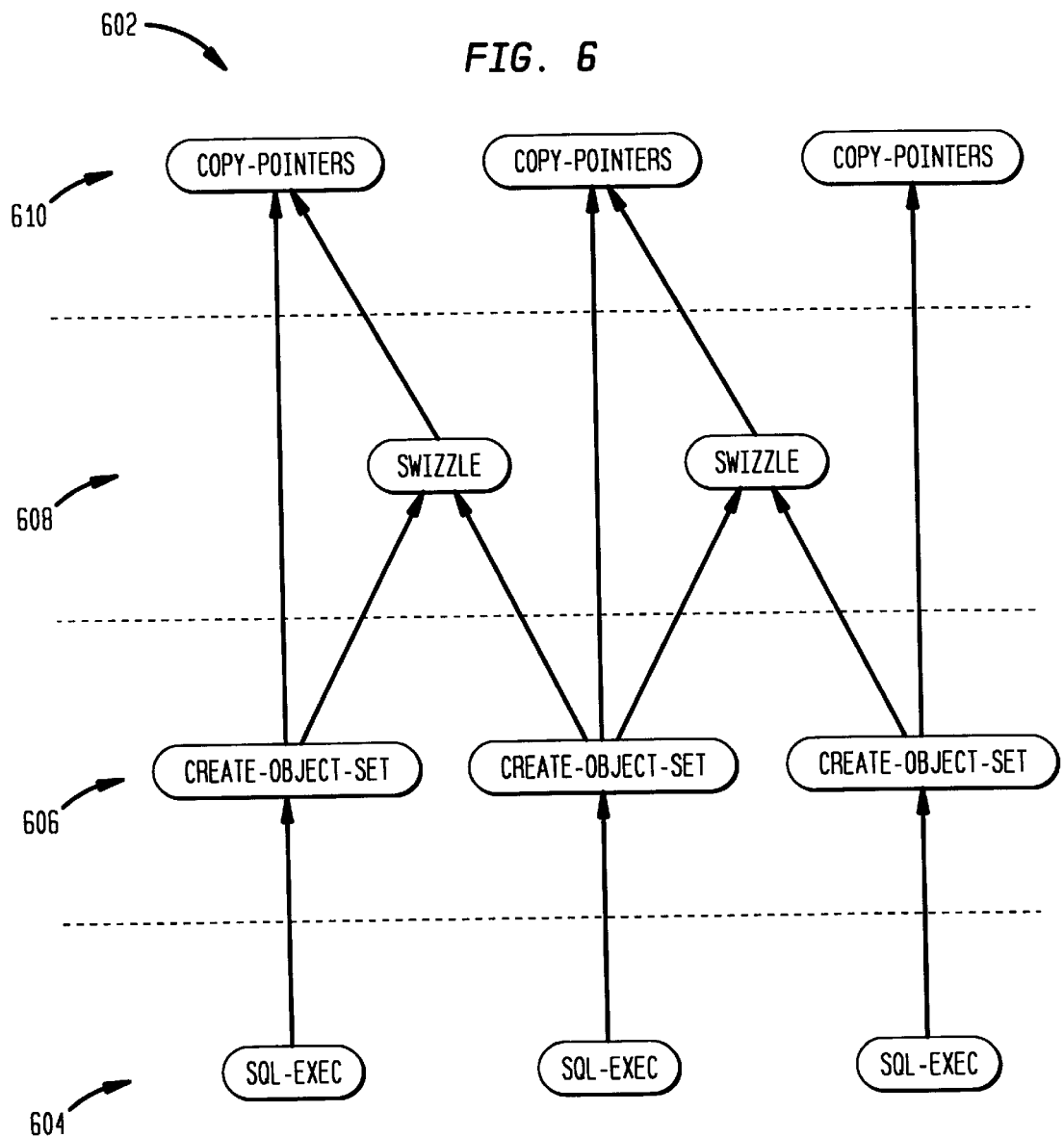
FIG. 6 illustrates an example directed acyclic graph (DAG) according to an embodiment of the present invention.

FIG. 6 illustrates an example directed acyclic graph (DAG) 602 according to a preferred embodiment of the present invention. The DAG 602 includes four types of nodes: relational query execution nodes 604 (also called SQL-exec nodes in the preferred embodiment), object creation nodes 606, swizzle nodes 608, and copy pointers nodes 610. The DAG nodes 604, 606, 608, and 610 are preferably implemented using a set of generic virtual base classes and a corresponding set of derived classes that inherit from the generic classes. The DAG nodes are preferably instances of the derived classes.

Preferably, the gateway 106 first creates the relational query execution nodes 604, then creates the object creation nodes 606, then creates the swizzle nodes 608, and then creates the copy pointers nodes 610. The gateway 106 also executes the nodes in this order. In particular, the gateway 106 first executes the relational query execution nodes 604, then executes the object creation nodes 606, then executes the swizzle nodes 608, and then executes the copy pointers nodes 610.

The relational query execution nodes 604 collectively represent the modified relational queries 410 generated by the query generator 402. The gateway 106 distributes these modified relational queries 410 among the SQL_exec nodes 604 when creating these nodes. This distribution is based on the nested prefetch structure (described below).

The gateway 106 executes a relational query execution node 604 by transferring the relational queries associated with the SQL_exec node 604 to the RDBMS 112, causing the RDEMS 112 to process these relational queries, and then receiving the tuples which the RDBMS 112 retrieved as a result of processing these relational queries. These tuples are transferred to the object creation node 606 that is associated (linked) with the SQL_exec node 604. Such operation represents step 512 in FIG. 5, discussed above.

The gateway 106 creates one object creation node 606 (of type class C) for each relational query execution node 604 that retrieves base attributes of class C. Each object creation node 606 is said to be linked to (or associated with) one of the relational query execution nodes 604.

The object creation nodes 606 cause the object generator 404 to create objects 414 for the tuples respectively transferred from the relational query execution nodes 604. Preferably, the instantiation of duplicate objects 414 is avoided by using object tables, which keep track of objects 414 that have been created. Object tables are discussed in U.S. patent application entitled "System and Method for Efficiently Translating Relational Tuples to Object-Oriented Objects", referenced above and incorporated by reference herein.

The object creation nodes 606 also cause the object generator 404 to create intermediate objects for the objects 414 that are involved in swizzling. Preferably, the present invention uses intermediate objects during swizzling operations to achieve performance advantages. Intermediate objects are discussed in U.S. patent application entitled "System and Method for Efficiently Translating Relational Tuples to Object-Oriented Objects", referenced above and incorporated by reference herein. Details of the object creation nodes 606 particular to the present invention are discussed below.

The gateway 106 creates a swizzle node 608 for each swizzle indicated by the nested prefetch structure. For example, suppose that the nested prefetch structure is as follows:

[department, {[emp_set, {}]}]

This corresponds to a top-level class of "Emp", and the following prefetch paths: "Emp.department" and "department.emp_set". The Emp.department prefetch path component indicates a swizzle between employee tuples and dept tuples. The department.emp_set prefetch path component indicates a swizzle between dept tuples and employees tuples. Thus, the gateway 106 creates two swizzle nodes 608, i.e., one swizzle node corresponding to the Emp.department prefetch path component, and another swizzle node corresponding to the department.emp_set prefetch path component.

The swizzle nodes 608 cause the object generator 404 to swizzle the intermediate objects which they receive from the object creation nodes 606. According to the present invention, for performance reasons, the gateway 106 performs swizzling by: (a) converting foreign keys to pointers or sets of pointers; and (b) setting relationship attributes in the intermediate objects equal to these pointers.

The gateway 106 creates a copy pointer node 610 for each object creation node 606 that participates in a swizzle operation for transforming foreign keys into pointers. The gateway 106 does not create copy pointers nodes 610 for relational query execution nodes 604 which retrieve tuples from intermediate tables.

The copy pointers nodes 610 cause the object generator 404 to copy the reference/relationship data members (i.e., pointers) in the intermediate objects to corresponding reference/relationship attributes in the objects 414 which are eventually transferred to the application 104.

Preferably, the present invention supports both query access and cursor access modes. In query access, the application 104 provides an object query and prefetch paths to the gateway 106, and the gateway 106 processes the object query and prefetch paths in a batch mode. In cursor access, the application 104 provides an object query and prefetch paths to the gateway 106, and the gateway 106 processes the object query and prefetch paths one step at a time (stepwise mode).

Directed acyclic graphs as used in the present invention are discussed further in U.S. patent application entitled "System and Method for Efficiently Translating Relational Tuples to Object-Oriented Objects", referenced above and incorporated by reference herein.

Step 508—Generating Relational Queries Capable of Retrieving Information Needed to Initialize Base Attributes of Target Objects, Including Base Attributes Defined by Super-classes and Sub-classes The manner in which the gateway 106 performs step 508 of FIG. 5 shall now be described with reference to a flowchart 702 in FIG. 7. Flowchart 702 begins with step 704, where control immediately passes to step 706.

In step 706, the query generator 402 analyzes the object query (issued by the application 104) and generates a relational query (called the translated object query) that is capable of retrieving from the RDBMS 112 information needed to initialize the base attributes of top-level object(s) of a target class that are defined by the target class. The top-level objects are the objects that can be constructed using the data that is retrieved from the relational database as a result of executing the object query. In other words, the top-level objects are explicitly identified by the object query. The top-level objects are also called target objects.

For example, consider the following example object query (all object queries shown herein are based on the well known ObjectStore Query Language, described in Orenstein et al., "Query Processing in the ObjectStore Database System", *Proceedings of the ACM SIGMOD Conference*, San Diego, Calif., 403–412, Jun. 1992, incorporated herein by reference).

Employees [: salary>20000 :]

This object query, which is based on the example classes and tables shown in FIG. 3A, operates to retrieve all objects (the target objects) of class Emp (the target class) where the salary base attribute is greater than 20,000. The query generator 402 generates the following relational query (i.e., translated object query) from the above object query:

SELECT E.name, E.eid, E.birthdate, E.salary
FROM Employee E
WHERE salary>20000

Note that this translated object query operates to retrieve from the RDBMS 112 only the base attributes (i.e., name, eid, birthdate, and salary) for only the target objects. This translated object query does not retrieve any information needed to initialize the non-base attributes (such as manager or department). Also, this translated object query does not retrieve any attributes (base or otherwise) from any objects other than the target object. Non-target objects include, for example, the objects pointed to by the manager and department pointers.

Relational queries are represented herein using well known SQL strings. (As will be appreciated, SQL (structured query language) is a well known database language first produced by International Business Machines (IBM) Corporation.) This high-level representation is used here to simplify the presentation of the algorithms and concepts involved and a real system implementing this algorithm could easily represent relational queries internally using alternate graph structures which are equivalent to SQL statements that have been parsed. The algorithm presented here will work with no changes for internal representations that are not strings.

Figure 10A:
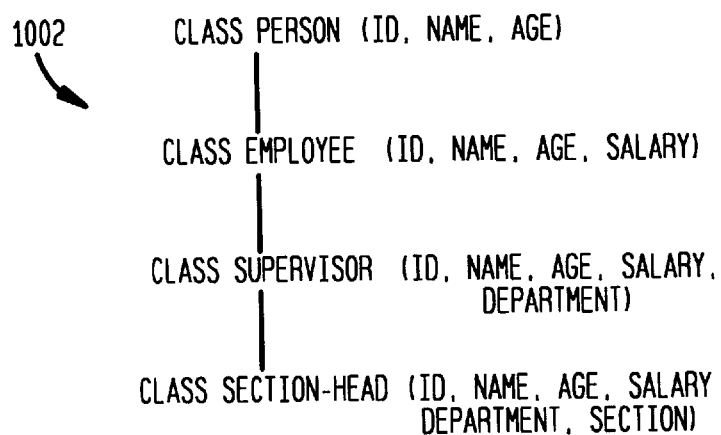
FIGS. 10A and 10B present an example scenario that is used to describe the manner in which the invention generates relational queries (taking into account super-classes and sub-classes)
Figure 10B:
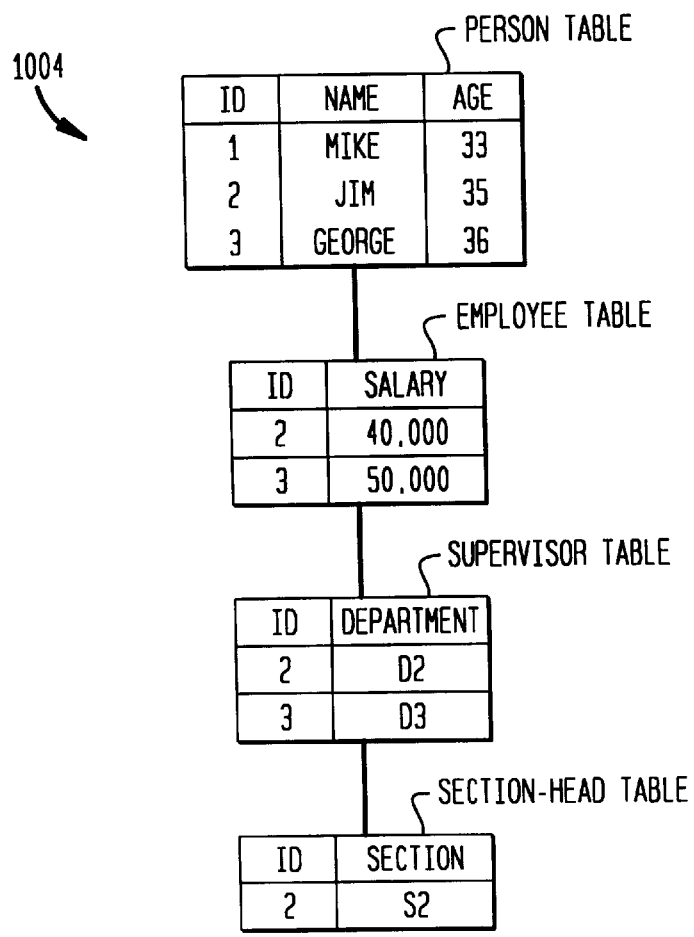

As just described above, the translated object query generated in step 706 is capable of retrieving from the RDBMS 112 information to initialize the base attributes of the target object(s) of the target class that are defined by the target class. However, the translated object query is not capable of retrieving information to initialize base attributes of the target object(s) that are defined by super-classes and/or sub-classes of the target class. This concept shall be illustrated with reference to FIG. 10A which shows an example class hierarchy 1002, and FIG. 10B which shows relational database tables 1004 corresponding to the class hierarchy 1002. (It should be noted that the scenario presented in FIGS. 10A and 10B is not the same as that shown in FIGS. 3A–3C.)

Suppose that the translated object query is as follows:

SELECT S.ID, S.name, S.age, S.salary, S.department

FROM Supervisor S

WHERE S.department=D2

According to this example, the Supervisor table is accessed and information pertaining to the ID and Department base attributes are retrieved. Note that both the ID and Department base attributes are defined by the target class Supervisor. This translated object query does not retrieve information pertaining to the base attributes that are not defined by the target class Supervisor. In particular, the translated object query does not retrieve information pertaining to the base attributes that are defined by the super-class Employee (the salary attribute) or the super-class Person (the name and age attributes). Also, the translated object query does not retrieve information pertaining to the base attributes that are defined by the sub-class Section-Head (the section attribute).

The remaining steps in flowchart 702 are directed towards the retrieval of base attributes that are defined by the super-classes and sub-classes. Steps 708, 710, 712, and 714 are directed to retrieve super-class information, and steps 716 and 718 are directed to retrieve sub-class information. If the target class has no super-classes, then steps 708, 710, 712, and 714 are not performed. If the target class has no sub-classes, then steps 716 and 718 are not performed. In the event that the target class has no super-classes and no sub-classes, then the translated object query is modified according to any prefetch paths during step 510 in FIG. 5.

According to the present invention, there are two approaches for retrieving super-class information. Which approach is used depends on the number of super-classes of the target class. In particular, in step 708 the query generator 402 determines whether the number of super-classes of the target class is greater than a predetermined super-class limit (discussed below). If the number of super-classes of the target class is not greater than the predetermined super-class limit, then a first approach as represented by step 712 is performed. Otherwise, a second approach as represented by step 710 is performed. The first approach and second approach shall now be described.

First Approach

According to the first approach (step 712), the query generator 402 generates a single relational query according to a Rule 1A shown in FIG. 8. Note that only one query is generated, irrespective of the number of super-classes that exist. The generation of this query is based on the translated object query.

FIG. 8 illustrates, in generic form, an object schema 808 for a class X and a class Y (where Y is a super-class of X), and a corresponding relational schema 806 for a table Xr and a table Yr. Also shown is a generic object query 802 on class X, and a corresponding translated object query 804.

Rule 1A in FIG. 8 illustrates a relational query 810 that is generated from the translated object query 804. The new relational query 810 (rather than the translated object query 804) is modified according to any prefetch paths during step 510 in FIG. 5.

To produce the relational query 810, the translated object query 804 is modified as follows:

(1) The base attributes defined by each super-class are appended to the "SELECT" statement of the translated object query 804.

(2) Each super-class is referenced in the "FROM" statement of the translated object query 804.

(3) For each super-class, a full join on the primary key common to the super-class and the target class is appended to the "WHERE" statement of the translated object query 804. Thus, where X is the target class, Y is the super-class, and "key" is the primary key common to X and Y, the following full join is added:

X.key=Y.key (4) A statement to order the retrieved tuples by the primary key of the target class is added to the translated object query 804.

The resulting query 810 operates to retrieve information needed to initialize the target objects' base attributes defined by the target class. The query 810 also operates to retrieve information needed to initialize the target objects' base attributes defined by super-classes of the target class.

According to Rule 1A, an additional full join operation is added to the "WHERE" statement of the translated object query 804 for each super-class of the target class. It is undesirable to have excessive numbers of join operations in any given query, since too many join operations may result in performance problems on some RDBMS's, or may not even work on other RDBMS's. Rule 1B (discussed below) is used when the number of super-classes (and, thus, the number of join operations) is too large given the RDBMS being used. The predetermined super-class limit that is used to determine whether Rule 1A or 1B is used is implementation dependent, and depends primarily on the join capacity of the RDBMS (i.e., the number of join operations in a single query that the RDBMS can handle).

Second Approach

According to the second approach (step 710), the query generator 402 generates N+1 relational queries according to a Rule 1B shown in FIG. 8, where N is equal to the number of super-classes of the target class. The generation of these queries is based on the translated object query.

Rule 1B in FIG. 8 illustrates two relational queries 812 and 814 that are generated from the translated object query 804. Query 812 operates to retrieve base attributes that are defined by the target class. A query, in the form of query 814, is generated for each super-class of the target class. These queries 814 operate to retrieve base attributes that are defined by the super-classes. Each of these "super-class" queries 814 includes only a single join operation in the "WHERE" statement, thereby avoiding the "join capacity" problem of Rule 1a (discussed above).

Figure 5:
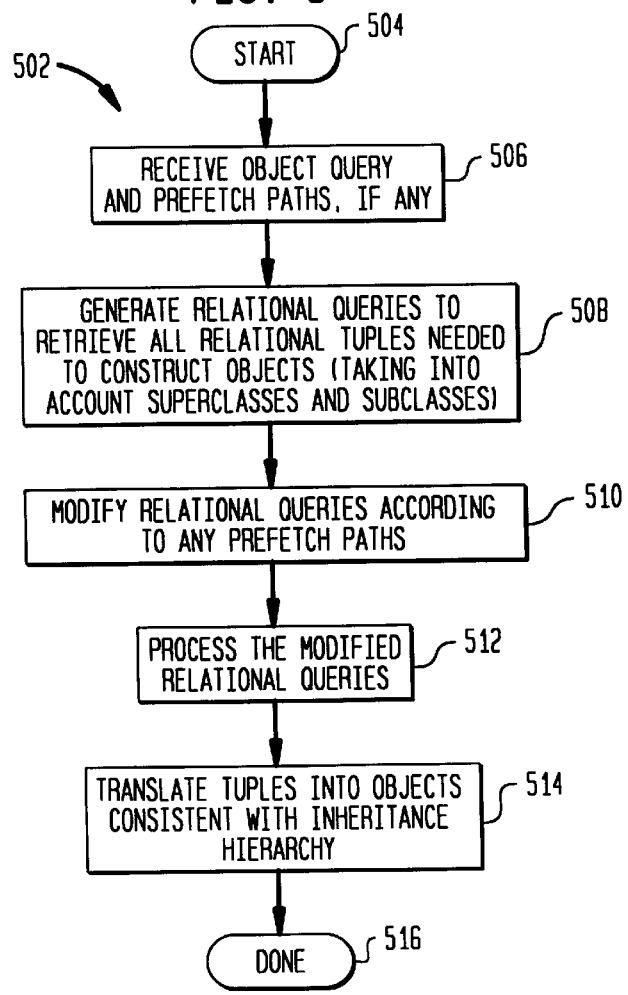
FIG. 5 is a flowchart depicting the high-level operation of the gateway according to a preferred embodiment of the present invention.

One or more of these new relational queries 812, 814 (rather than the translated object query 804) are modified according to any prefetch paths during step 510 in FIG. 5.

To produce the relational query 812, the translated object query 804 is modified as follows:

(1) A statement to order the retrieved tuples by the primary key of the target class is added to the translated object query 804.

To produce a relational query 814 for a super-class Y, the translated object query 804 is modified as follows:

(1) The base attributes defined by the target class X in the "SELECT" statement of the translated object query 804 are replaced by the base attributes defined by the super-class Y.

(2) The super-class Y is referenced in the "FROM" statement of the translated object query 804.

(3) A full join on the primary key common to the super-class Y and the target class X is appended to the "WHERE" statement of the translated object query 804.

(4) A statement to order the retrieved tuples by the primary key of the super-class Y is added to the translated object query 804.

The resulting queries 812, 814 operate to retrieve information needed to initialize the target objects' base attributes defined by the target class, and to retrieve information needed to initialize the target objects' base attributes defined by super-classes of the target class.

Figure 7:
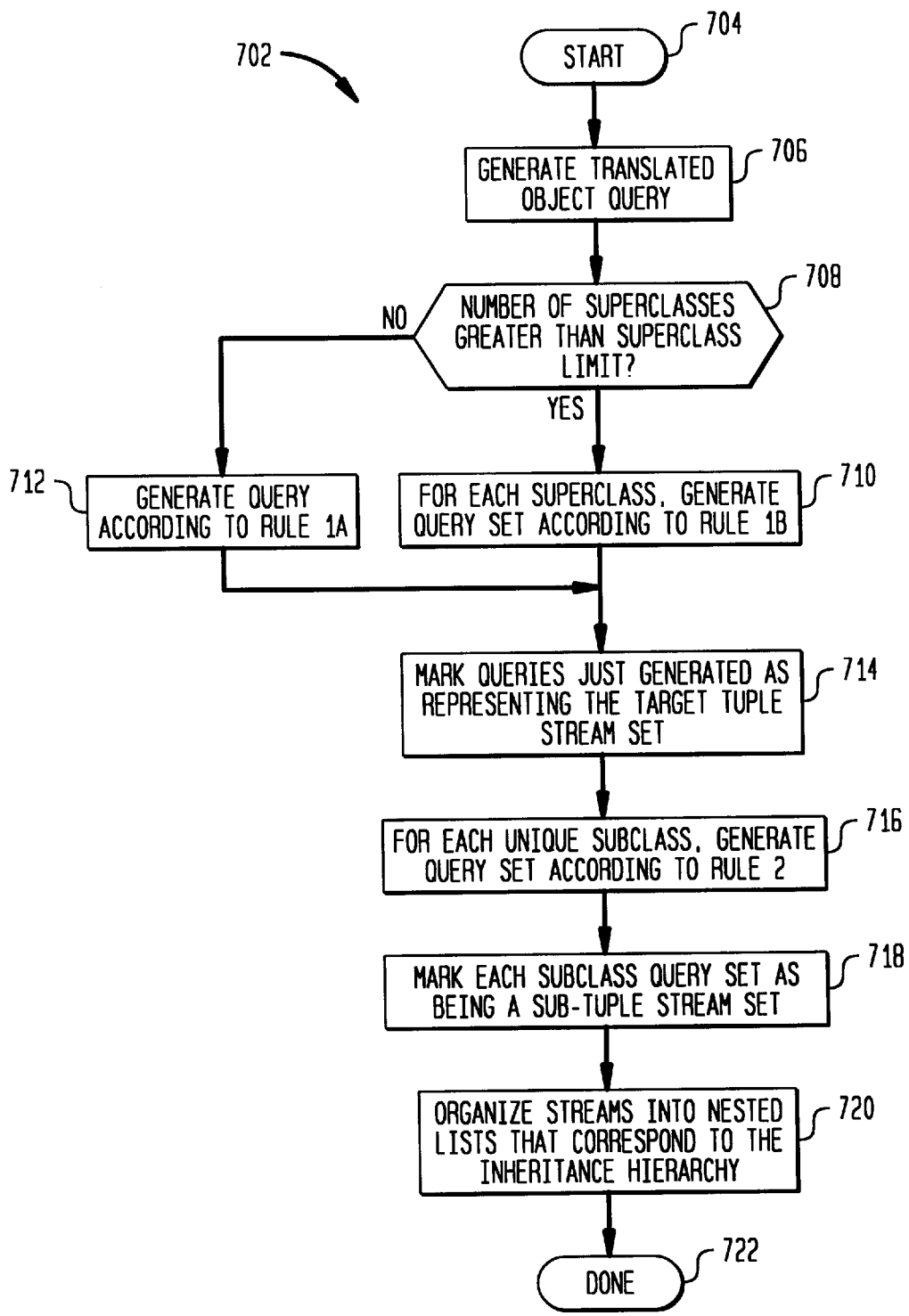
FIG. 7 is a flowchart depicting the manner in which the present invention generates relational queries (taking into account super-classes and sub-classes)

Referring again to flowchart 702 in FIG. 7, step 714 is performed after the performance of either step 710 or step 712. In step 714, the queries generated in either step 710 or step 712 are marked (by setting a flag, for example) as representing a "target tuple stream set." The target tuple stream set includes the queries that retrieve information needed to initialize the base attributes defined by the target class and any super-classes.

In step 716, the query generator 402 generates a set of relational queries capable of retrieving information needed to initialize the target object's base attributes that are defined by any sub-classes of the target class. According to a preferred embodiment of the present invention, the query generator 402 generates this set of queries in accordance with a Rule 2, which is shown in FIG. 9. Rule 2 is similar to Rule 1B.

FIG. 9 illustrates, in generic form, an object schema 908 for a class X and a class Y (where Y is a sub-class of X), and a corresponding relational schema 906 for a table Xr and a table Yr. Also shown is a generic object query 902 on class X, and a corresponding translated object query 904.

Rule 2 in FIG. 9 illustrates two relational queries 910 and 912 that are generated from the translated object query 904. Query 910 operates to retrieve base attributes that are defined by the target class. Note that query 910 is generated only if Rules 1A and 1B are not applied (that is, only if the target class has no super-classes). Otherwise, appropriate queries are generated according to Rules 1A and 1B, as shown in FIG. 8.

A query, in the form of query 912, is generated for each sub-class of the target class. These queries 912 operate to retrieve base attributes that are defined by the sub-classes. Each of these "sub-class" queries 912 includes only a single join operation in the "WHERE" statement, thereby avoiding a "join capacity" problem.

One or more of these new relational queries 910, 912 (rather than the translated object query 904, and assuming that query 910 is actually generated) are modified according to any prefetch paths during step 510 in FIG. 5.

To produce the relational query 910, the translated object query 904 is modified as follows:

(1) A statement to order the retrieved tuples by the primary key of the target class is added to the translated object query 804.

To produce a relational query 912 for a sub-class Y, the translated object query 904 is modified as follows:

(1) The base attributes defined by the target class X in the "SELECT" statement of the translated object query 904 are replaced by the base attributes defined by the sub-class Y.

(2) The sub-class Y is referenced in the "FROM" statement of the translated object query 904.

(3) A full join on the primary key common to the sub-class Y and the target class X is appended to the "WHERE" statement of the translated object query 904.

(4) A statement to order the retrieved tuples by the primary key of the sub-class Y is added to the translated object query 904.

The resulting queries 910, 912 operate to retrieve information needed to initialize the target objects' base attributes defined by the target class, and to retrieve information needed to initialize the target objects' base attributes defined by sub-classes of the target class.

Referring again to flowchart 702 in FIG. 7, step 718 is performed after the performance of step 716. In step 718, the queries generated in step 716 are marked (by setting a flag, for example) as representing a "sub-tuple stream set." The sub-tuple stream set includes the queries that retrieve information needed to initialize the base attributes defined by the sub-classes.

In step 720, the target tuple stream set and the sub-tuple stream set are organized into nested, ordered lists that correspond to (or mirrors) the class inheritance hierarchy. The query generator 402 performs step 720 by obtaining sub-class and super-class information from the schema mapping module 108.

One list that is generated in step 720 corresponds to the target tuple stream set. The classes that are referenced by (or associated with) the target tuple stream set are ordered in this list from the greatest derived class (i.e., the lowest level sub-class) to the parent (root) class. Consequently, the target class is always listed first in this list. As a convention, the classes are listed from left to right in order of decreasing derivation. Increasing derivation means lower down in the class hierarchy and decreasing derivation means higher up in the class hierarchy.

Figure 16A:
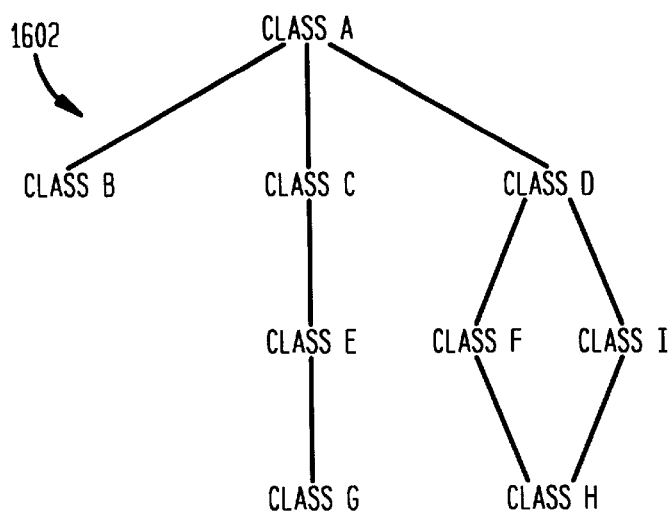
FIGS. 16A, 16B, 17A, and 17B are used to illustrate the manner in which the present invention performs tuple-to-object translation so as to adhere to a class inheritance hierarchy specified in an object schema.

Consider, for example, FIG. 16A showing an example class inheritance hierarchy 1602. Suppose that class A is the target class, such that the target tuple stream set references only class A (class A does not have any super-classes, as it is the parent or root class of the class hierarchy 1602). In this case, the list corresponding to the target tuple stream set is as follows: [A].

Now assume that the target class is class E, such that the target tuple stream set references classes A, C, and E. In this case, the list corresponding to the target tuple stream set is as follows: [ECA].

Also in step 720, zero or more ordered lists are generated for the sub-tuple stream set. Specifically, an ordered list is generated for each unique sub-class branch represented by classes referenced in the sub-tuple stream set, although the target class is not a member of any of these lists. The classes are ordered in these lists from the greatest derived class to the least derived class. As a convention, the classes are listed in each list from left to right in order of decreasing derivation.

A unique branch is defined as follows: Given an inheritance hierarchy and target class, remove the edges connecting the target class from its immediate descendants. Each connected component of the graph except for the one containing the target class is a unique branch. A connected component is defined as the (maximum) set of nodes and edges between the nodes such that each node is reachable from the other nodes in the set by traversing a path through the set of edges.

Figure 18A:
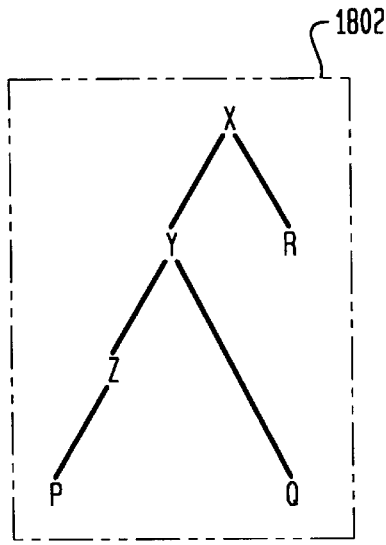
FIGS. 18A–18D are used to illustrate unique branches.
Figure 18B:
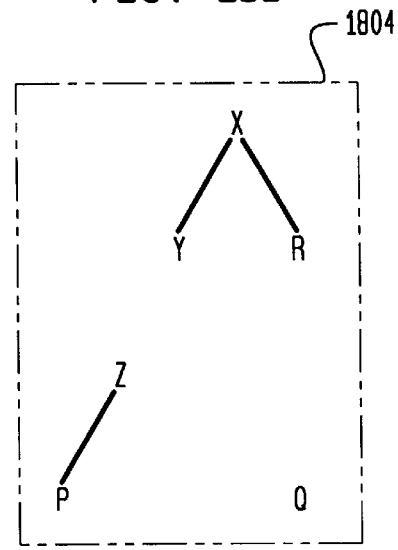

Consider an example hierarchy 1802 shown in FIG. 18A, where the target class is Y. The corresponding hierarchy 1804 after removing edges between the target class Y and its descendants is shown in FIG. 18B. In FIG. 18B, there are three connected components. There are two unique branches, one containing nodes Z and P, while the other contains the single node Q. As defined above, the connected component containing the target class Y is not considered a unique branch.

Figure 18C:
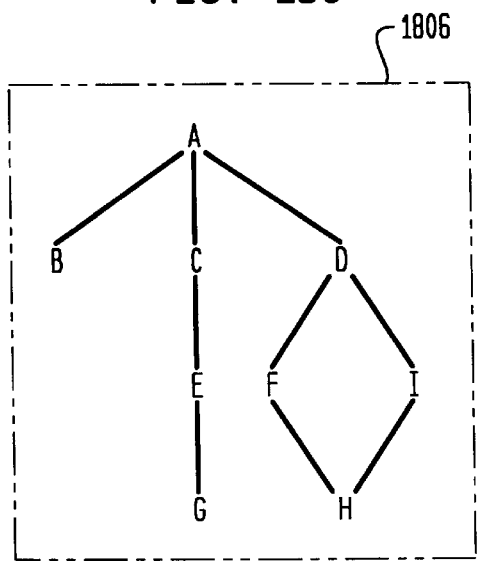
Figure 18D:
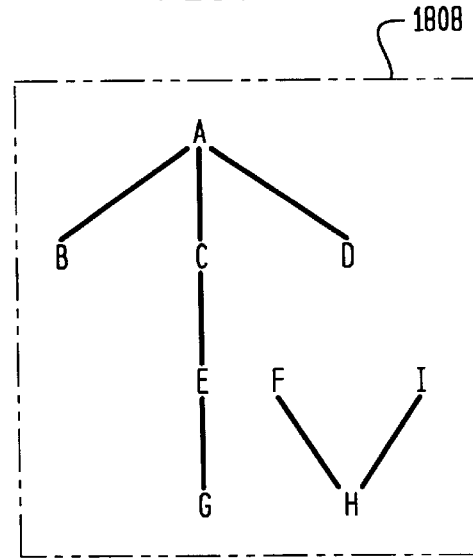

Consider another example hierarchy 1806 in FIG. 18C where the target class is again class D. The corresponding hierarchy 1808 after removing connected components is shown in FIG. 18D. There is one unique branch containing three nodes F, I, and H.

Consider again the example class inheritance hierarchy 1602 in FIG. 16A. Suppose that class A is the target class, such that the sub-tuple stream set references classes A–I. In this case, there are three unique branches represented by classes A–I, and thus the following three lists are generated to represent the sub-tuple stream set:

[B]
[GEC]
[H[FI]D]

The notation [FI] within the list [H[FI]D] indicates that classes incomparable, i.e., they are at the same level (one is not a super-class or sub-class of the other).

Flowchart 702 is complete after step 720 is performed, as indicated by step 722.

Step 510—Modifying Relational Queries In Accordance With Prefetch Paths

As discussed above, in step 510 of FIG. 5 the query generator 402 modifies the relational queries 410 (generated during step 508) in accordance with any prefetch paths received from the application 104. The modified relational queries 410, in addition to being capable of retrieving tuples needed to initialize base attributes of the target objects, are also capable of retrieving from the RDBMS 112 information needed to initialize base attributes of objects (called "prefetch path objects" for reference purposes) of classes (called "prefetch path classes" for reference purposes) identified by the prefetch paths, including base attributes of the prefetch path objects that are defined by any super-classes and any sub-classes of the prefetch path classes (as defined by the object oriented schema). Step 510 is further described in this section.

Nested Prefetch Path Representation

The query generator 402 processes the prefetch paths by first translating the prefetch paths, which are in object-oriented form, to a nested representation of prefetch paths still in object-oriented form. Preferably, the nested representation of prefetch paths is generated by analyzing and collapsing the prefetch paths into a recursive representation (i.e., the nested representation of prefetch paths, also called the nested prefetch structure or nested prefetch path representation) that eliminates duplicates and nests them such that each component in each prefetch path only appears once. The root of this nested prefetch structure is the top level class.

For example, suppose that the top-level class is "Emp", and the prefetch paths include the following: "department", "department.proj_set", and "department.emp_set". In this example, the nested prefetch structure would be as follows:

[department, {[proj_set, {}], [emp_set, {}]}]

Processing Prefetch Paths Without Consideration of Super-classes and Sub-classes This section describes the manner in which the query generator 402 modifies the translated object query in accordance with any prefetch paths when super-classes and sub-classes are not a consideration. The query generator 402 operates as described in this section when the target class and the prefetch path classes have no super-classes or sub-classes. (Note that, if the target class has no super-classes or sub-classes, then no relational queries 410 are generated in step 508. Accordingly, in step 510 the query generator 402 operates to modify the translated object query in accordance with the prefetch paths.)

After generating the nested prefetch structure (as described above), the query generator 402 traverses the nested prefetch structure and generates the relational queries 410 (from the translated object query) using schema mapping information obtained by appropriately querying the schema mapping module 108. In order to generate these relational queries, it is necessary to follow a number of rules (developed by the inventors). Which rule is followed depends on whether the prefetch paths contain one-to-one, one-to-many, or many-to-many relationships.

Consider, for example, FIG. 11 which specifies an example schema mapping, an object query, and a prefetch path on the schema. The Required Query is also indicated. This scenario represents a 1-to-many relationship, since each employee has one department, but each department may have multiple employees.

The Required Query is the logical query that needs to be executed in order to retrieve all of the tuple data needed to satisfy the object query and the specified prefetch path(s). The translated object query is the relational query that will retrieve the tuple data needed to initialize only the base attributes of the top-level class (i.e., no prefetch paths have been taken into account while generating the translated object query). The translated object query for the scenario in FIG. 11 is as follows (only base attributes of the top-level class will be retrieved):

SELECT E.eid, E.name, E.salary
FROM Employee E
WHERE E.salary>10

FIG. 11 also indicates the relational queries 410 generated by the query generator 402. For this particular object query and prefetch path, two relational queries 1102, 1104 are generated. The first query 1102 operates to retrieve the Employee tuples that satisfy the condition of salary>10 (note that this condition is contained in the original object query). These Employee tuples are sorted by deptid, which is the foreign key to the dept table.

The second query 1104 operates to retrieve the Dept tuples related to the Employee tuples retrieved by the first query 1102. In this instance, a Dept tuple is related to an Employee tuple if the Dept primary key (did) is equal to the corresponding Employee foreign key (deptid). These dept tuples are sorted by did.

The manner in which the query generator 402 generates relational queries 410 in accordance with any prefetch paths when super-classes and sub-classes are not a consideration is further described in U.S. patent application entitled "Generating an Optimized Set of Relational Queries for Fetching Data in an Object-Relational Database Gateway," referenced above and incorporated by reference herein.

Processing Prefetch Paths When Super-classes and/or Sub-classes Exist

This section describes the manner in which the query generator 402 modifies the relational queries 410 (generated during step 508 in FIG. 5) in accordance with any prefetch paths when the target class and/or the prefetch path classes have one or more super-classes and/or sub-classes. The operation of the query generator 402 when super-classes/sub-classes are considered is similar to the operation when super-classes/sub-classes are not considered (described above). However, when super-classes/sub-classes are considered, the prefetch paths may be rooted in a super-class. Since super-class attributes might be retrieved using separate queries, the foreign key projection list(s) must be added to the correct query(ies).

The pseudocode presented below represents the operation of the query generator 402 when modifying the relational queries 410 (generated during step 508 in FIG. 5) in accordance with any prefetch paths when one or more super-classes and/or sub-classes exist.

```
foreach prefetch path H starting from target class C do
    S = class that H is originally defined in (can be C or
        any super-class of C);
    Qs = the relational query to initialize the base
        attributes of the class S.
    if the foreign key is in table corresponding to S,
    then
        modify Qs to fetch the foreign key columns in the
        projection list and add this information to the
        object creation nodes 606 to create appropriate
        intermediate objects which will be used for
        swizzling the foreign keys to pointers;
    endif;
    if H points to members of class R, then
        create the query Qr using the same rules that are
        used when super-classes/sub-classes are not
        considered;
        if R is also in an inheritance hierarchy, then
            transform Qr and add new queries for the
            super-classes and sub-classes (as described
            above);
        endif;
        if the foreign key is in the table corresponding
        to class R, then
            modify Qr to fetch the foreign key columns
            in the projection list and add this
            information to the object creation nodes 606
            to create the intermediate objects
            appropriately;
        endif;
    endif;
end foreach;
```

Figure 12:
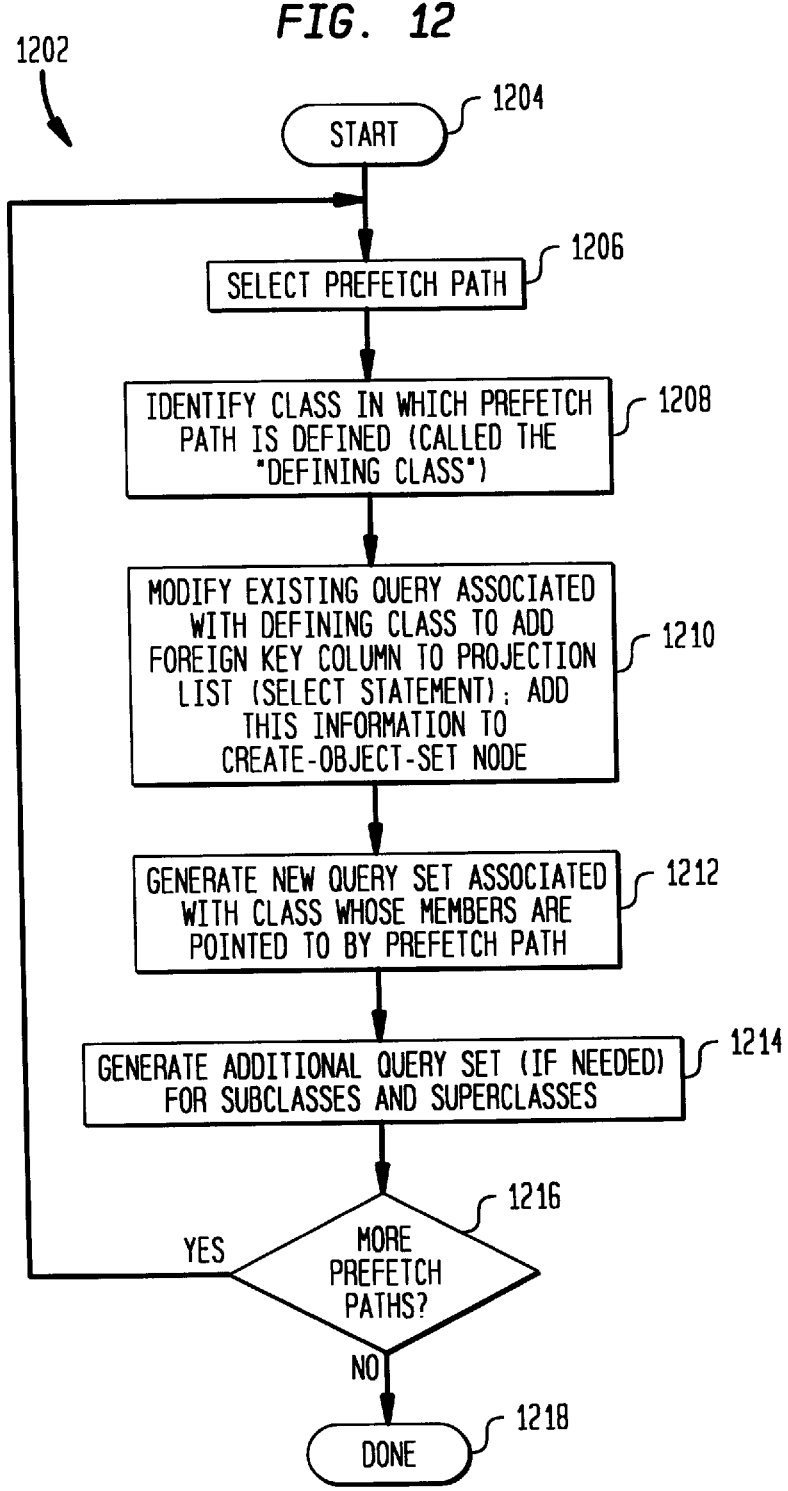
FIG. 12 is a flowchart depicting the manner in which the present invention modifies relational queries in accordance with prefetch paths when super-classes and sub-classes are considered.

The operation of the query generator 402 when modifying the relational queries 410 (generated during step 508 in FIG. 5) in accordance with any prefetch paths when one or more super-classes and/or sub-classes exist is also represented by flowchart 1202 in FIG. 12 (flowchart 1202 and the pseudocode shown above are equivalent). Flowchart 1202 begins with step 1204, where control immediately passes to step 1206.

In step 1206, the query generator 402 selects for processing one of the prefetch paths in the nested prefetch structure.

In step 1208, the query generator 402 identifies the class in which the selected prefetch path is defined. For reference purposes, this class is called the "defining class". The query generator 402 performs step 1208 by appropriately querying the schema mapping module 108. Step 1208 shall now be described further with reference to an example scenario presented in FIGS. 13A, 13B, and 14.

Figure 13A:
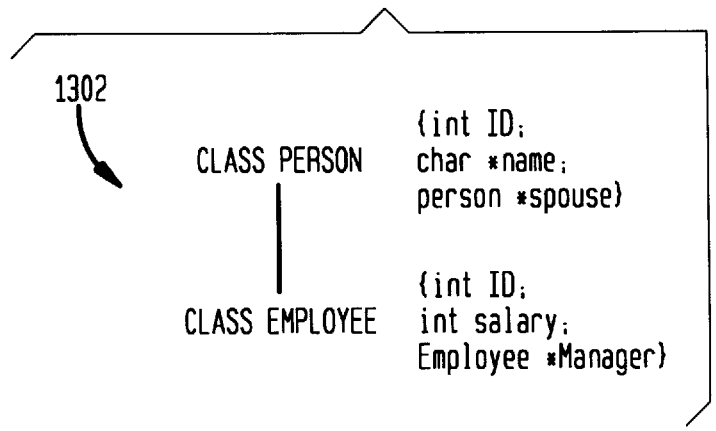
Figure 13B:
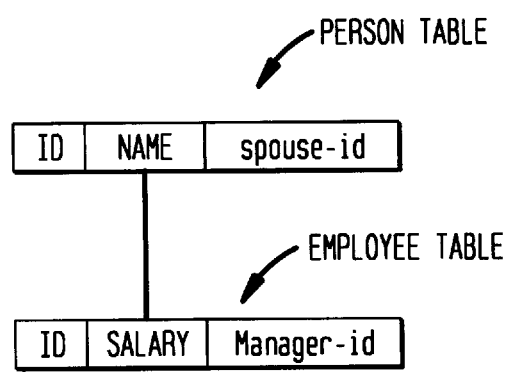

FIG. 13A illustrates an example class inheritance hierarchy 1302 and FIG. 13B illustrates tables which correspond to the class inheritance hierarchy 1302. FIG. 14 illustrates an example object query 1402 and prefetch path 1404. FIG. 14 also illustrates the queries 1406, 1408 that the query generator 402 generated in step 508 (FIG. 5) to represent the object query 1402 (the manner in which queries 1406, 1408 were generated is described above). Query 1406 retrieves from the RDBMS 112 information needed to initialize the target object's base attributes that are defined by the target class (note that, in this case, the class Employee is the target class). Query 1408 retrieves from the RDBMS 112 information needed to initialize the target object's base attributes that are defined by the sole super-class (i.e., class Person) of the target class Employee.

Suppose, in step 1206, the query generator 402 selects the prefetch path 1404. In step 1208, the query generator 402 identifies the class (the defining class) in which the selected prefetch path 1404 is defined. In this example, the prefetch path 1404 refers a "spouse" attribute, which is defined by the class Person (this is clear from inspection of FIG. 13A). Accordingly, in step 1208 the query generator 402 determines that the class Person is the defining class for the prefetch path 1404.

In step 1210, the query generator 402 modifies the query (generated in step 508 of FIG. 5) associated with the defining class. In particular, the query generator 402 adds the foreign key column (from the relational table corresponding to the defining class) specified by the selected prefetch path to the projection list (i.e., the SELECT statement) of the query (generated in step 508 of FIG. 5) associated with the defining class. Consider the example scenario presented in FIGS. 13A, 13B, and 14. The defining class is the class Person, which corresponds to the Person table. The selected prefetch path 1404 specifies the attribute "spouse" from the class Person. This attribute "spouse" maps to the foreign key "spouse-id" in the Person table. Accordingly, in step 1210, the query generator 402 adds the "spouse-id" foreign key column from the Person table to the SELECT statement of query 1408, which is associated with the defining class Person. This modification of original query 1408 is shown as query 1412 in FIG. 14, where text that has been added is underlined.

Also in step 1210, the query generator 402 incorporates information pertaining to these modifications to the affected create-object-set nodes in the DAG (see FIG. 6).

Specifically, in step 1210 the query generator 402 adds information to swizzle the foreign keys to pointers to the object creation nodes 606. This information is used by the object creation nodes 606 to create intermediate objects with the foreign key information which is used during the swizzle process.

In step 1212, the query generator 402 generates a new relational query set associated with the class whose members are pointed to by the selected prefetch path. This new query set operates to retrieve from the RDBMS 112 information necessary to initialize the prefetch path objects' base attributes defined by the prefetch path class (as specified by the selected prefetch path). The manner in which the query generator 402 performs step 1212 is the same as the manner in which the query generator 402 modifies a translated object query in accordance with a prefetch path component (where super-classes and subclasses are not considered), as described above, and as further described in U.S. patent application entitled "System and Method for Efficiently Translating Relational Tuples to Object-Oriented Objects", referenced above and incorporated by reference herein. The new query set generated by the query generator 402 in the example scenario of FIGS. 13A, 13B, and 14 is represented by query 1414.

In step 1214, the query generator 402 generates an additional relational query set (if necessary) for any super-classes and/or sub-classes of the prefetch path class. This new query set operates to retrieve from the RDBMS 112 information necessary to initialize the prefetch path objects' base attributes defined by the prefetch path class's super-classes and sub-classes (if any). The query generator 402 performs step 1214 in accordance with flowchart 702 (FIG. 7) and Rules 1A, 1B, and 2 (FIGS. 8 and 9), which are described above.

In step 1216, the query generator 402 determines whether there are any more prefetch paths in the nested prefetch structure to process. If there are one or more prefetch paths in the nested prefetch structure left to process, then control returns to step 1206. Otherwise, operation of flowchart 1202 is complete, as indicated by step 1218.

Step 514-Translating Tuples to Objects While Adhering to Class Inheritance Hierarchy In step 514 of flowchart 502 (FIG. 5), the object generator 404 in step 514 efficiently translates tuples received from the RDBMS 112 into object-oriented objects 414. According to the present invention, the tuple-to-object translation of step 514 is performed so as to adhere to the class inheritance hierarchy defined by the object oriented schema. Preferably, the gateway 106 generates the create-object-set nodes 606 in the DAG 602 such that, when the object generator 404 processes such create-object-set nodes 606, the object generator 404 creates and initializes objects in accordance with the class inheritance hierarchy defined by the object oriented schema.

The operation of the object generator 404 while performing step 514 (i.e., while processing the create-object-set nodes 606) shall now be described with reference to a flowchart 1502 in FIG. 15. Flowchart 1502 begins with step 1504, where control immediately passes to step 1506.

In step 1506, the object generator 404 selects for processing a tuple that was retrieved (in step 512) as result of execution of the target tuple stream set. As discussed above, the target tuple stream set includes the queries that retrieve information needed to initialize the base attributes defined by the target class and any super-classes.

Figure 17A:
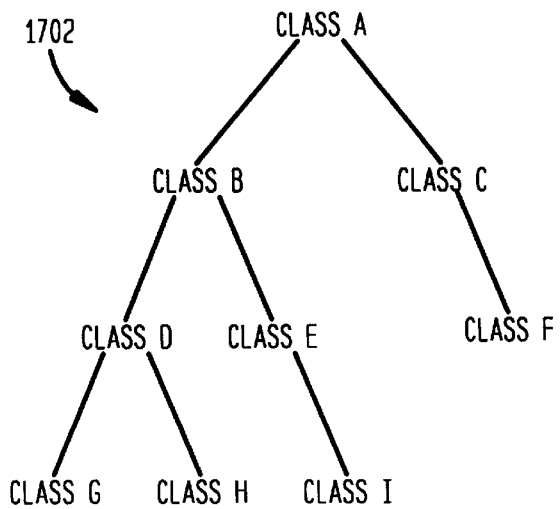
Figure 17B:
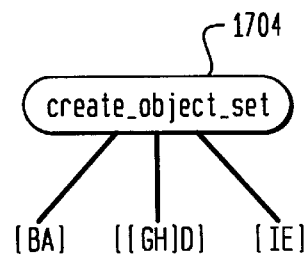

Consider, for example, FIG. 17A showing an example class inheritance hierarchy 1702. Suppose that class B is the target class (the create-object-set node that is generated in accordance with this example is shown in FIG. 17B as create-object-set node 1704). In this case, the target tuple stream set references classes A and B. In this case, the ordered list corresponding to the target tuple stream set is as follows: [BA]. This list is called "Target List 1" for reference purposes. In step 1506, the object generator 404 selects for processing a tuple that was retrieved as a result of executing queries on classes A and B.

Figure 16B:
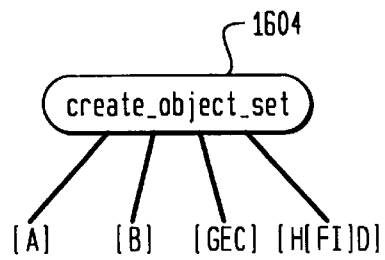

(For comparison purposes, FIG. 16A shows an example class inheritance hierarchy 1602. Suppose that class A is the target class. The create-object-set node that is generated in accordance with this example is shown in FIG. 16B as create-object-set node 1604.)

In the following steps, the present invention operates to create and initialize an object to represent this selected tuple (i.e., to translate the tuple to an object). This tuple-to-object translation is performed so as to adhere to the class inheritance hierarchy defined by the object oriented schema.

In step 1508, the object generator 404 selects for processing a sub-tuple stream set. As described above, a sub-tuple stream set includes the queries that retrieve information needed to initialize the base attributes defined by the sub-classes. In the example of FIG. 17A, where class B is the target class, the ordered lists corresponding to the sub-tuple stream set are as follows: [[GH]D] and [IE]. For reference purposes, these lists are called "Sub-tuple List 1" and "Sub-tuple List 2," respectively. For illustrative purposes, assume that Sub-tuple List 1 is selected by the object generator 404 in step 1508.

In step 1510, the object generator 404 selects the greatest derived class in the ordered list corresponding to the selected sub-tuple stream set. Since the classes in this ordered list were previously ordered from greatest derived class to lowest derived class (moving left to right), the object generator 404 selects the left-most class in this ordered list. In the example of FIG. 17A, class G is selected (note that class H could have alternatively been selected, since classes G and H are incomparable). Two classes are incomparable if one is not a sub-type (recursively) of the other.

Queries on the relational table that maps to the class selected in step 1510 were previously processed by the RDBMS 112 (in step 512 of FIG. 5). The tuples resulting from the processing of such queries were returned to the gateway 106, and such tuples are said to be associated with the sub-tuple stream set that was selected in step 1508. More particularly, these tuples are said to be associated with (or map to) the class selected in step 1510.

In step 1512, the object generator 404 determines whether the primary key of the tuple selected in step 1506 is present in any of the tuples that map to the class selected in step 1510. Consider the example scenario presented in FIG. 3C. Suppose that, in step 1506, the object generator 404 selected a tuple having the primary key value a1=20 (assume that class A is the target class). Suppose that, in step 1510, class B was selected. Suppose that the tuples that were previously retrieved from the RDBMS 112, and that map to class B, are those tuples in Table B having primary key values a1=20, 30. In this example, the object generator 404 in step 1512 determines that the primary key a1=20 of the tuple selected in step 1506 is, in fact, present in one of the tuples that map to the class B selected in step 1510.

If, in step 1512, the object generator 404 determines that the primary key of the tuple selected in step 1506 is not present in any of the tuples that map to the class selected in step 1510 (if this is the case, then the object generator 404 has determined that the tuple does not correspond to an object of the class selected in step 1510), then step 1520 is performed. In step 1520, the object generator 404 determines whether there are additional classes in the selected sub-tuple stream set to process. If there are more classes to process, then the next most derived class is selected in step 1522 (moving from left to right in the ordered list corresponding to the selected sub-tuple stream set), and control returns to step 1512. If there are not more classes in the selected sub-tuple stream set to process, then step 1524 is processed.

In step 1524, the object generator 404 determines whether there are additional sub-tuple streams to process. If there are additional sub-tuple streams to process, then control returns to step 1508 where another sub-tuple stream is selected (the order in which the sub-tuple streams are selected and processed is not important). If there are not additional sub-tuple streams to process, then step 1526 is processed.

In step 1526, the object generator 404 creates an object of the target class. In step 1528, the object generator 404 initializes the base attributes of this newly created object using information contained in particular tuples (i.e., tuples having the same primary key value as the tuple selected in step 1506) associated with the target tuple stream set (i.e., [BA] in the example of FIGS. 17A and 17B). These attributes are those defined by the target class and by any super-classes of the target class. The tuples associated with the target tuple stream set that pertain to the tuple selected in step 1506 are easily identified given that these tuples were previously ordered by the primary key (see FIGS. 8 and 9).

In step 1518, the object generator 404 determines whether there are additional tuples associated with the target tuple stream set that remain to be processed. If additional tuples remain to be processed, then control returns to step 1506. Otherwise, the operation of flowchart 1502 is complete, as indicated by step 1550.

Recall that, in step 1512, the object generator 404 determines whether the primary key of the tuple selected in step 1506 is present in any of the tuples that map to the class selected in step 1510. If the object generator 404 determines in step 1512 that the primary key of the tuple selected in step 1506 is present in one of the tuples that map to the class selected in step 1510, then step 1514 is performed. (If this is the case, then the object generator 404 has determined that the tuple corresponds to an object of the class selected in step 1510.)

In step 1514, the object generator 404 creates an object of the class selected in step 1510. In step 1516, the object generator 404 initializes the base attributes of this newly created object using information contained in particular tuples (i.e., tuples having the same primary key value as the tuple selected in step 1506) associated with the target tuple stream set and tuples associated with the target class's sub-classes leading to and including the class selected in step 1510. These attributes are those defined by the target class and by any super-classes of the target class. These tuples that pertain to the tuple selected in step 1506 are easily identified given that these tuples were previously ordered by the primary key (see FIGS. 8 and 9). Step 1518 (described above) is processed after step 1516 is complete.

Figure 19:
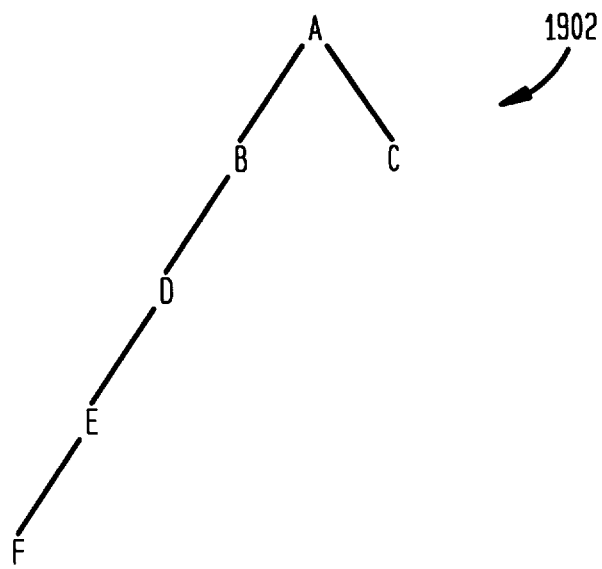
FIGS. 19 and 20 illustrate example class hierarchies used to illustrate the operation of the invention.

Consider an example hierarchy 1902 in FIG. 19. In this example, an object query was issued on a target class B. Suppose in step 1510 class E was selected. Then, in step 1514, a new object of type class E is created. The target tuple stream will initialize the attributes defined in class 2 and class A where class B is the target class. The remaining attributes of the newly created object will be initialized by tuples associated with the target class B's sub-classes up to and including the selected class E.

Further details pertaining to the manner in which the object generator 404 performs step 514 is discussed in U.S. patent application entitled "System and Method for Efficiently Translating Relational Tuples to Object-Oriented Objects", referenced above and incorporated by reference herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A method of processing object-oriented queries so as to retrieve data from a relational database management system (RDBMS), comprising the steps of:
    (1) receiving an object-oriented query and at least one prefetch path from an object-oriented source, said object-oriented query identifying one or more target objects of a target class which are desired to be constructed, said at least one prefetch path identifying one or more prefetch path objects which are desired to be constructed; and
    (2) generating from said object-oriented query a set of relational queries that, when processed, enable said RDBMS to retrieve tuples required to initialize base attributes of said target objects that are defined by said target class and by any super-classes and sub-classes of said target class;
    wherein said stop (2) includes the steps of:
        (a) determining whether the number of super-classes of said target class is greater than a super-class limit, and
        (b if the number of super-classes of said target class is greater than sad super-class limit, then generating a query for each super-class of said target class, wherein said query, when processed, enables said RDBMS to retrieve base attributes of said each super-class.

2. The method of claim 1, wherein step (2) comprises the steps of:
    (a) generating a translated object query from said object-oriented query, said translated object query being a relational database query that, when processed, enables said RDBMS to retrieve data needed to initialize base attributes of said target objects that are defined by said target class; and
    (b) generating from said translated object query one or more relational queries that, when processed, enable said RDBMS to retrieve tuples required to initialize base attributes of said target objects that are defined by said target class and by any super-classes of said target class.

3. The method of claim 2 in which said object-oriented query includes a condition list, and in which said RDBMS includes a first table that maps to said target class and zero or more second tables that respectively map to said any super-classes of said target class, wherein step (b) comprises the step of:
    generating, from said translated object query, a relational query that, when processed by said RDBMS, enables said RDBMS to retrieve from said first table first tuples that satisfy said condition list, and that enables said RDBMS to retrieve from said second tables second tuples that have primary key values equal to primary key values of said first tuples.

4. The method of claim 2 in which said object-oriented query includes a condition list, and in which said RDBMS includes a first table that maps to said target class and zero or more second tables that respectively map to said any super-classes of said target class, wherein step (b) comprises the step of:
    generating a first relational query by modifying said translated object query to include a statement to order first tuples retrieved from said first table by a primary key of said target class; and
    generating, from said translated object query, a second relational query for each super-class of said target class, said second relational query, when processed by said RDBMS, enabling said RDBMS to retrieve from a second table corresponding to said each super-class second tuples that satisfy said condition list, and that have primary key values equal to primary key values of said first tuples.

5. The method of claim 1, wherein step (2) comprises the steps of:
    (a) generating a translated object query from said object-oriented query, said translated object query being a relational database query that, when processed, enables said RDBMS to retrieve data needed to initialize base attributes of said target objects that are defined by said target class; and
    (b) generating from said translated object query one or more relational queries that, when processed, enable said RDBMS to retrieve tuples required to initialize base attributes of said target objects that are defined by said target class and by any sub-classes of said target class.

6. The method of claim 5 in which said object-oriented query includes a condition list, and in which said RDBMS includes a first table that maps to said target class and zero or more second tables that respectively map to said any sub-classes of said target class, wherein step (b) comprises the step of:

generating a first relational query by modifying said translated object query to include a statement to order first tuples retrieved from said first table by a primary key of said target class; and generating, from said translated object query, a second relational query for each sub-class of said target class, said second relational query, when processed by said RDBMS, enabling said RDBMS to retrieve from a second table corresponding to said each sub-class second tuples that satisfy said condition list, and that have primary key values equal to primary key values of said first tuples.

7. The method of claim 1 in which said object-oriented query includes a condition list, and in which said RDBMS includes a first table that maps to said target class, zero or more second tables that respectively map to said any super-classes of said target class, and zero or more third tables that respectively map to said any sub-classes of said target class, wherein step (2) comprises the steps of:

(a) generating a translated object query from said object-oriented query, said translated object query being a relational database query that, when processed, enables said RDBMS to retrieve data needed to initialize base attributes of said target objects that are defined by said target class;

(b) generating a first relational query by modifying said translated object query to include a statement to order first tuples retrieved from said first table by a primary key of said target class;

(c) generating, from said translated object query, a second relational query for each super-class of said target class, said second relational query, when processed by said RDBMS, enabling said RDBMS to retrieve from a second table corresponding to said each super-class second tuples that satisfy said condition list, and that have primary key values equal to primary key values of said first tuples; and (d) generating, from said translated object query, a third relational query for each sub-class of said target class, said third relational query, when processed by said RDBMS, enabling said RDBMS to retrieve from a third table corresponding to said each sub-class third tuples that satisfy said condition list, and that have primary key values equal to primary key values of said first tuples.

8. The method of claim 1, further comprising the steps of:

(3) modifying said set of relational queries according to said at least one prefetch path to produce a modified set of relational queries that, when processed, enable said RDBMS to retrieve tuples required to initialize base attributes of said prefetch path objects that are defined by said prefetch path class and by any super-classes and sub-classes of said prefetch path class; and (4) causing said RDBMS to process said set of relational queries.

9. The method of claim 8, wherein step (3) comprises the steps of:

identifying a defining class in which each prefetch path is defined;

identifying a query in said set of relational queries that is directed to retrieving tuples from said defining class;

modifying said identified query so as to enable said RDBMS to retrieve foreign key information from a relational table corresponding to said defining class;

generating an additional set of relational queries that, when processed, enables said RDBMS to retrieve tuples required to initialize base attributes of said prefetch path objects that are defined by said prefetch path class and by any super-classes and sub-classes of said prefetch path class.

10. The method of claim 1, further comprising the steps of:

(3) translating said tuples to object-oriented objects consistent with a class inheritance hierarchy defined by an object-oriented schema.

11. The method of claim 10 in which said set of relational queries comprises a target tuple stream set and one or more sub-tuple stream sets, said target tuple stream set comprising queries that enable said RDBMS to retrieve tuples needed to initialize base attributes of said target objects defined by said target class and any super-classes of said target class, each sub-tuple stream set comprising queries that enable said RDBMS to retrieve information needed to initialize base attributes of said target objects defined by classes in a unique sub-class branch of said class inheritance hierarchy, step (3) comprising the steps of:

(a) selecting a tuple retrieved as a result of processing queries in said target tuple stream set;

(b) selecting a sub-tuple stream set;

(c) selecting a greatest derived class in said selected sub-tuple stream set;

(d) determining whether a primary key value of said selected tuple appears in a retrieved tuple that maps to said selected class;

(e) if a primary key value of said selected tuple appears in a retrieved tuple that maps to said selected class, then creating a new object of said selected class; and (f) initializing base attributes of said new object using information contained in said selected tuple and in other retrieved tuples having a primary key value equal to a primary key value of said selected tuple.

12. The method of claim 11, wherein step (3) further comprises the following steps that are performed if it is determined in step (d) that a primary key value of said selected tuple does not appear in a retrieved tuple that maps to said selected class:

(g) determining whether there are additional classes in said selected sub-tuple stream set left to process;

(h) if there are additional classes in said selected sub-tuple stream set left to process, then selecting a next most derived class in said selected sub-tuple stream set; and (i) returning to step (d).

13. The method of claim 12, wherein step (3) further comprises the following steps that are performed if it is determined in step (g) that there are no additional classes in said selected sub-tuple stream set left to process:

(j) determining whether there are additional sub-tuple stream sets left to process;

(k) if there are additional sub-tuple stream sets left to process, then selecting another of said sub-tuple stream sets; and (m) returning to step (c).

14. The method of claim 13, wherein step (3) further comprises the following steps that are performed if it is determined in step (j) that there are no additional sub-tuple stream sets left to process:

(n) creating a new object of said target class; and (o) initializing base attributes of said new object of said target class using information contained in said selected tuple and in other retrieved tuples having a primary key value equal to a primary key value of said selected tuple.

15. An object-relational database gateway for use in a computing environment having a relational database management system (RDBMS), objects in said computing environment conforming to a class inheritance hierarchy defined by an object-oriented schema, said gateway comprising:

receiving means for receiving an object-oriented query and at least one prefetch path from an object-oriented source, said object-oriented query identifying one or more target objects of a target class which are desired to be constructed, said at least one prefetch path identifying one or more prefetch path objects which are desired to be constructed; and query set generating means for generating from said object-oriented query a set of relational queries that, when processed, enable said RDBMS to retrieve tuples required to initialize base attributes of said target objects that are defined by said target class and by any super-classes and sub-classes of said target class;

wherein said query set generating means includes:
(a) means for determining whether the number of super-classes of said target class is greater than a super-class limit, and
(b) means for generating a query for each super class of said target class if the number of super-classes of said target class is greater than said super-class limit, wherein said query, when processed, enables said RDBMS to retrieve base attributes of said each super-class.

16. The gateway of claim 15, wherein said query set generating means comprises:

means for generating a translated object query from said object-oriented query, said translated object query being a relational database query that, when processed, enables said RDBMS to retrieve data needed to initialize base attributes of said target objects that are defined by said target class; and relational query generating means for generating from said translated object query one or more relational queries that, when processed, enable said RDBMS to retrieve tuples required to initialize base attributes of said target objects that are defined by said target class and by any super-classes of said target class.

17. The gateway of claim 16, wherein said object-oriented query includes a condition list, and wherein said RDBMS includes a first table that maps to said target class and zero or more second tables that respectively map to said any super-classes of said target class, wherein said relational query generating means comprises:

means for generating, from said translated object query, a relational query that, when processed by said RDBMS, enables said RDBMS to retrieve from said first table first tuples that satisfy said condition list, and that enables said RDBMS to retrieve from said second tables second tuples that have primary key values equal to primary key values of said first tuples.

18. The gateway of claim 16, wherein said object-oriented query includes a condition list, and wherein said RDBMS includes a first table that maps to said target class and zero or more second tables that respectively map to said any super-classes of said target class, wherein said relational query generating means comprises:

means for generating a first relational query by modifying said translated object query to include a statement to order first tuples retrieved from said first table by a primary key of said target class; and means for generating, from said translated object query, a second relational query for each super-class of said target class, said second relational query, when processed by said RDBMS, enabling said RDBMS to retrieve from a second table corresponding to said each super-class second tuples that satisfy said condition list, and that have primary key values equal to primary key values of said first tuples.

19. The gateway of claim 15, wherein said query set generating means comprises:

means for generating a translated object query from said object-oriented query, said translated object query being a relational database query that, when processed, enables said RDBMS to retrieve data needed to initialize base attributes of said target objects that are defined by said target class; and relational query generating means for generating from said translated object query one or more relational queries that, when processed, enable said RDBMS to retrieve tuples required to initialize base attributes of said target objects that are defined by said target class and by any sub-classes of said target class.

20. The gateway of claim 19, wherein said object-oriented query includes a condition list, and wherein said RDBMS includes a first table that maps to said target class and zero or more second tables that respectively map to said any sub-classes of said target class, wherein said relational query generating means comprises:

means for generating a first relational query by modifying said translated object query to include a statement to order first tuples retrieved from said first table by a primary key of said target class; and means for generating, from said translated object query, a second relational query for each sub-class of said target class, said second relational query, when processed by said RDBMS, enabling said RDBMS to retrieve from a second table corresponding to said each sub-class second tuples that satisfy said condition list, and that have primary key values equal to primary key values of said first tuples.

21. The gateway of claim 15, wherein said object-oriented query includes a condition list, and wherein said RDBMS includes a first table that maps to said target class, zero or more second tables that respectively map to said any super-classes of said target class, and zero or more third tables that respectively map to said any sub-classes of said target class, wherein said query set generating means comprises:

means for generating a translated object query from said object-oriented query, said translated object query being a relational database query that, when processed, enables said RDBMS to retrieve data needed to initialize base attributes of said target objects that are defined by said target class;

means for generating a first relational query by modifying said translated object query to include a statement to order first tuples retrieved from said first table by a primary key of said target class;

means for generating, from said translated object query, a second relational query for each super-class of said target class, said second relational query, when processed by said RDBMS, enabling said RDBMS to retrieve from a second table corresponding to said each super-class second tuples that satisfy said condition list, and that have primary key values equal to primary key values of said first tuples; and means for generating, from said translated object query, a third relational query for each sub-class of said target class, said third relational query, when processed by said RDBMS, enabling said RDBMS to retrieve from a third table corresponding to said each sub-class third tuples that satisfy said condition list, and that have primary key values equal to primary key values of said first tuples.

22. The gateway of claim 15, further comprising:

relational query set modifying means for modifying said set of relational queries according to said at least one prefetch path to produce a modified set of relational queries that, when processed, enable said RDBMS to retrieve tuples required to initialize base attributes of said prefetch path objects that are defined by said prefetch path class and by any super-classes and sub-classes of said prefetch path class.

23. The gateway of claim 22, wherein said relational query set modifying means comprises:

means for identifying a defining class in which each prefetch path is defined;

means for identifying a query in said set of relational queries that is directed to retrieving tuples from said defining class;

means for modifying said identified query so as to enable said RDBMS to retrieve foreign key information from a relational table corresponding to said defining class; and means for generating an additional set of relational queries that, when processed, enables said RDBMS to retrieve tuples required to initialize base attributes of said prefetch path objects that are defined by said prefetch path class and by any super-classes and sub-classes of said prefetch path class.

24. The gateway of claim 15, further comprising:

translating means for translating said tuples to object-oriented objects consistent with said class inheritance hierarchy.

25. The gateway of claim 15, wherein said set of relational queries comprises a target tuple stream set and one or more sub-tuple stream sets, said target tuple stream set comprising queries that enable said RDBMS to retrieve tuples needed to initialize base attributes of said target objects defined by said target class and any super-classes of said target class, each sub-tuple stream set comprising queries that enable said RDBMS to retrieve information needed to initialize base attributes of said target objects defined by classes in a unique sub-class branch of said class inheritance hierarchy, said translating means comprising:

means for selecting a tuple retrieved as a result of processing queries in said target tuple stream set;

means for selecting a sub-tuple stream set;

means for selecting a greatest derived class in said selected sub-tuple stream set;

means for determining whether a primary key value of said selected tuple appears in a retrieved tuple that maps to said selected class;

means for creating a new object of said selected class if a primary key value of said selected tuple appears in a retrieved tuple that maps to said selected class; and means for initializing base attributes of said new object using information contained in said selected tuple and in other retrieved tuples having a primary key value equal to a primary key value of said selected tuple.

26. An object-relational database gateway for use in a computing environment having a relational database management system (RDBMS), object-oriented objects in said computing environment conforming to a class inheritance hierarchy defined by an object-oriented schema, said gateway comprising:

a query generator to generate from an object-oriented query a set of relational queries, said object-oriented query identifying one or more target objects of a target class which are desired to be constructed, said set of relational queries, when processed, enabling said RDBMS to retrieve tuples required to initialize base attributes of said target objects that are defined by said target class and by any super-classes and sub-classes of said target class; and a tuple-to-object translator to translate said tuples to object-oriented objects consistent with said class inheritance hierarchy;

wherein said query generator determines whether the number of super-classes of said target class is greater than a super-class limit, and generates a query for each super class of said target class if the number of super-classes of said target class is greater than said super-class limit wherein said query when processed, enables said RDBMS to retrieve base attributes of said each super-class.

27. A computer system, comprising:

a processor;

a relational database management system (RDBMS), coupled to said processor;

a controller to control said processor, comprising:

a query generator to enable said processor to generate from an object-oriented query a set of relational queries, said object-oriented query identifying one or more target objects of a target class which are desired to be constructed, said set of relational queries, when processed, enabling said RDBMS to retrieve tuples required to initialize base attributes of said target objects that are defined by said target class and by any super-classes and sub-classes of said target; and a tuple-to-object translator to enable said processor to translate said tuples to object-oriented objects consistent with a class inheritance hierarchy defined by an object-oriented schema;

wherein said query generator determines whether number of super-classes of said target class is greater than a super-class limit, and generates a query for each super class of said target class if the number of super-classes of said target class is greater than said super-class limit, wherein said query, when processed, enables said RDBMS to retrieve base attributes of said each super-class.

28. A controller for enabling a processor to process object-oriented queries so as to retrieve data from a relational database management system (RDBMS), comprising:

a query generator to enable said processor to generate from an object-oriented query a set of relational queries, said object-oriented query identifying one or more target objects of a target class which are desired to be constructed, said set of relational queries, when processed, enabling said RDBMS to retrieve tuples required to initialize base attributes of said target objects that are defined by said target class and by any super-classes and sub-classes of said target class; and a tuple-to-object translator to enable said processor to translate sad tuples to object-oriented objects consistent with a class inheritance hierarchy defined by an object-oriented schema;

wherein said query generator determines whether the number of super-classes of said target class is greater than a super-class limit, and generates a query for each super class of said target class if the number of super-classes of said target class is greater than said super-class limit, wherein said query, when processed, enables said RDBMS to retrieve base attributes of said each super-class;

wherein said query generator determines whether the number of super-classes of said target class is greater than a super-class limit, and generates a query for each super class of said target class if the number of super-classes of said target class is greater than said super-class limit wherein said query, when processed, enables said RDBMS to retrieve base attributes of said each super-class.

* * * * *